US012061431B2

(12) United States Patent
Yoshino et al.

(10) Patent No.: US 12,061,431 B2
(45) Date of Patent: Aug. 13, 2024

(54) IMAGE FORMING APPARATUS AND OPERATION UNIT FOR OPERATING THE SAME

(71) Applicant: CANON KABUSHIKI KAISHA, Tokyo (JP)

(72) Inventors: Daiju Yoshino, Ibaraki (JP); Shingo Hattori, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/303,192

(22) Filed: Apr. 19, 2023

(65) Prior Publication Data

US 2023/0251598 A1 Aug. 10, 2023

Related U.S. Application Data

(63) Continuation of application No. 17/579,390, filed on Jan. 19, 2022, now Pat. No. 11,656,567.

(30) Foreign Application Priority Data

Feb. 3, 2021 (JP) ................................ 2021-015971

(51) Int. Cl.
*G03G 15/00* (2006.01)
*G03G 21/16* (2006.01)

(52) U.S. Cl.
CPC ......... *G03G 15/5016* (2013.01); *G03G 15/80* (2013.01); *G03G 21/1604* (2013.01); *G03G 21/1652* (2013.01)

(58) Field of Classification Search
CPC ............... G03G 15/5016; G03G 15/80; G03G 21/1604; G03G 21/1647; G03G 21/1652
See application file for complete search history.

(56) References Cited

U.S. PATENT DOCUMENTS 11,656,567 B2 * 5/2023 Yoshino ............ G03G 21/1652 399/81

* cited by examiner

*Primary Examiner* — Sophia S Chen
(74) *Attorney, Agent, or Firm* — Canon U.S.A., Inc. IP Division

(57) ABSTRACT

An image forming apparatus includes an image forming unit configured to form an image on paper, an operation unit, and a controller to receive an execution signal and control the image forming unit. The operation unit includes a touch panel display to receive a touch operation by a user, and to display an execution icon to be touched by the user to enable the operation unit to transmit the execution signal to the image forming apparatus. The operation unit further includes a cable connected to the operation unit to transmit the execution signal to the controller, an exterior cover configured to form an exterior, and an insertion member disposed on a side opposite to a side where the touch panel display is disposed on an outside of the exterior cover to pass fingertips of the user through when the user operates the operation unit while holding up the operation unit.

9 Claims, 20 Drawing Sheets

IMAGE FORMING APPARATUS AND OPERATION UNIT FOR OPERATING THE SAME

CROSS REFERENCE TO RELATED APPLICATIONS

The present application is a continuation of U.S. patent application Ser. No. 17/579,390, filed on Jan. 19, 2022, which claims priority from Japanese Patent Application No. 2021-015971, filed Feb. 3, 2021, all of which are hereby incorporated by reference herein in their entireties.

BACKGROUND

Field

The present disclosure relates to an image forming apparatus and an operation unit for operating the image forming apparatus.

Description of the Related Art

Image forming apparatuses such as copying machines are provided with an operation unit operated by the user to switch between operations and make detailed settings in each operation. In a system (image forming system) where optional apparatuses such as a paper feed unit, a conveyance unit, and a post-processing unit are connected with an image forming apparatus, the user performs setting operations for various optional apparatuses by using the operation unit.

In a large-sized image forming system having a long length connected with a plurality of optional apparatuses as described above, the user may perform operations for the optional apparatuses on a location apart from the image forming apparatus provided with the operation unit. It is troublesome for the user to move between these optional apparatuses each time the user operates the optional apparatuses and the operation unit.

There is proposed an image forming system, for example, where an operation unit can be installed not only on an image forming apparatus but also on optional apparatuses (Japanese Patent Application Laid-Open No. 2010-243977). The operation unit discussed in Japanese Patent Application Laid-Open No. 2010-243977 includes a display that displays information to the user, an arm that supports the display, and a supporting base that supports the display via the arm. The display supported by the arm extending from the supporting base forms a predetermined angle with respect to a placement surface where the supporting base is placed.

For example, when the display panel of the operation unit displays small images and texts, some users may feel it hard to view. In this case, such a user adjusts the posture by bending down or comes close to the display panel. In this way, the posture and the distance to the display panel with which the display of the display panel is easily viewable are different from user to user.

For this reason, a form where the user can operate the operation unit placed on the palm will be considered below. Generally, when the user operates the operation unit placed on the palm, the fingertips are upwardly oriented so that the palm is oriented toward the user's face. In this state, each user is able to operate the operation unit with the posture most suitable for the user by adjusting the angles of the arm and wrist.

In a possible situation, the user operating the operation unit placed on the palm may show the display of the operation unit to another user next to the user. As a specific example of a specific situation, the user has a preview screen for a print product or a print condition setting screen to be checked by another user before printing. When the user shows the display to the user next to him/her, the user twists the wrist with the fingertips upwardly oriented so that the palm is oriented toward the face of the user next to him/her. As a result, the display of the operation unit placed on the palm is oriented toward the next user's face.

However, when the user shows the display of the operation unit to the user next to him/her in this way, the operation unit may possibly slip down from the palm. If the operation unit slips down from the palm and then hits the floor, the operation unit may possibly be damaged by the impact.

SUMMARY

According to an aspect of the present disclosure, an image forming apparatus having a placement surface as a top surface of the image forming apparatus includes an image forming unit configured to form an image on paper, and an operation unit configured to be operated by a user to transmit an execution signal for instructing the image forming unit to perform image formation, wherein the operation unit is configured to allow an operation while the operation unit is in a state of being held up by the user and in a state of being placed on the placement surface of the image forming apparatus at an arbitrary position within a predetermined range, and a controller configured to receive the execution signal and control the image forming unit, wherein the operation unit includes: a touch panel display configured to receive a touch operation by the user, and to display an execution icon to be touched by the user to enable the operation unit to transmit the execution signal to the image forming apparatus, a cable having one of both ends of the cable connected to the operation unit and configured to transmit the execution signal to the controller, an exterior cover configured to form an exterior, and an insertion member disposed on a side opposite to a side where the touch panel display is disposed on an outside of the exterior cover and configured to pass fingertips of the user through when the user operates the operation unit while holding up the operation unit, and wherein the predetermined range is a range where the operation unit is movable in a state of being connected to the cable.

Further features of the present disclosure will become apparent from the following description of exemplary embodiments with reference to the attached drawings.

DESCRIPTION OF THE EMBODIMENTS

Figure 1:
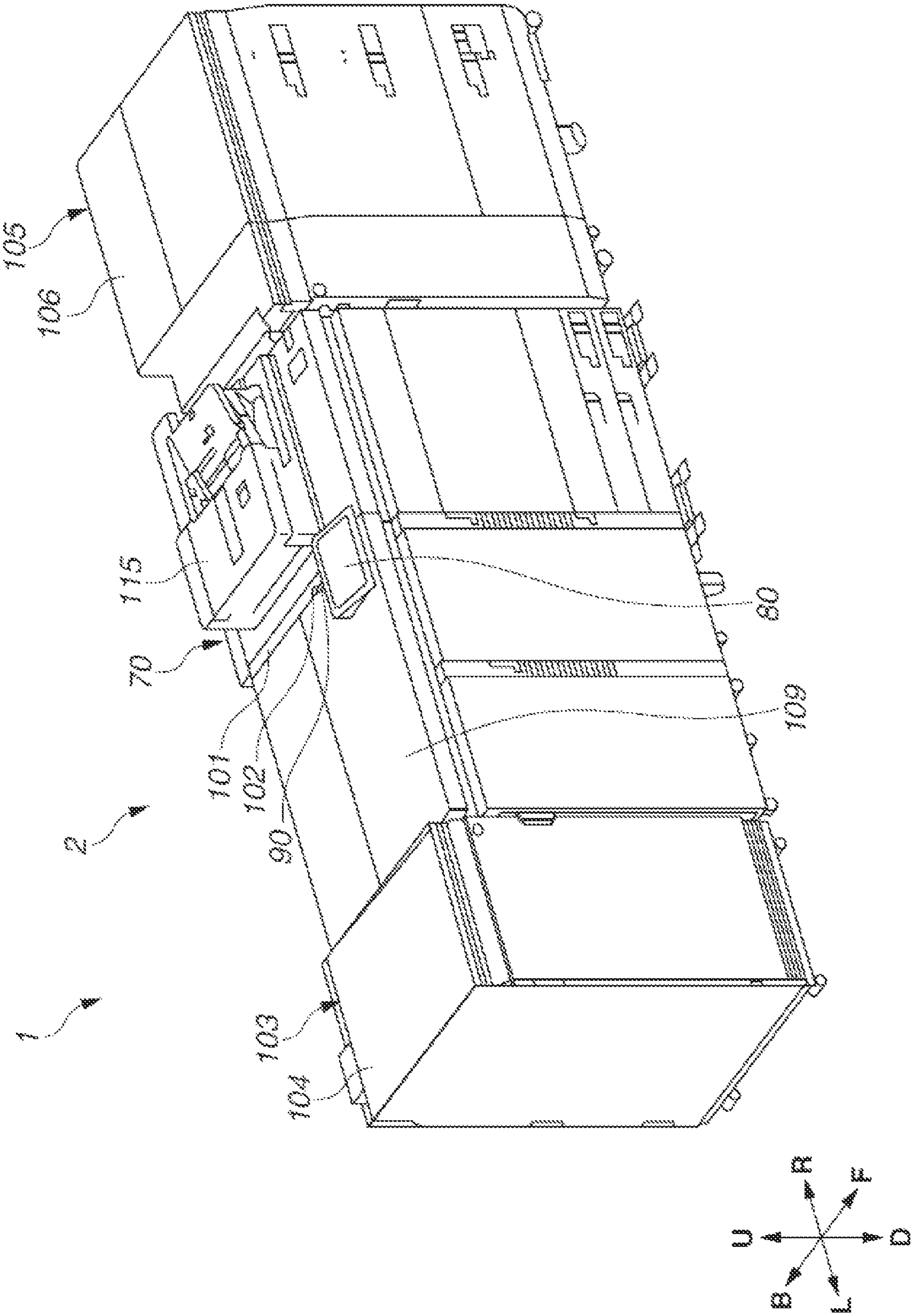
FIG. 1 is a schematic cross-sectional view illustrating an image forming system.

Exemplary embodiments of the present disclosure will be described below with reference to the accompanying drawings. Sizes, materials, shapes, and relative arrangements of elements described in the exemplary embodiments are not limited thereto. Unless otherwise specifically described, the scope of the present disclosure is not limited to the exemplary embodiments described below. Descriptions of the present exemplary embodiment will be made based on the directions defined as illustrated in FIG. 1. The front side, the rear side (back side), the left-hand side, the right-hand side, the upper side, and the lower side of an image forming apparatus 2 are defined as a front direction F, a rear direction B, a left direction L, a right direction R, an upward direction U, and a downward direction D, respectively.

Configuration of Image Forming System

Figure 2:
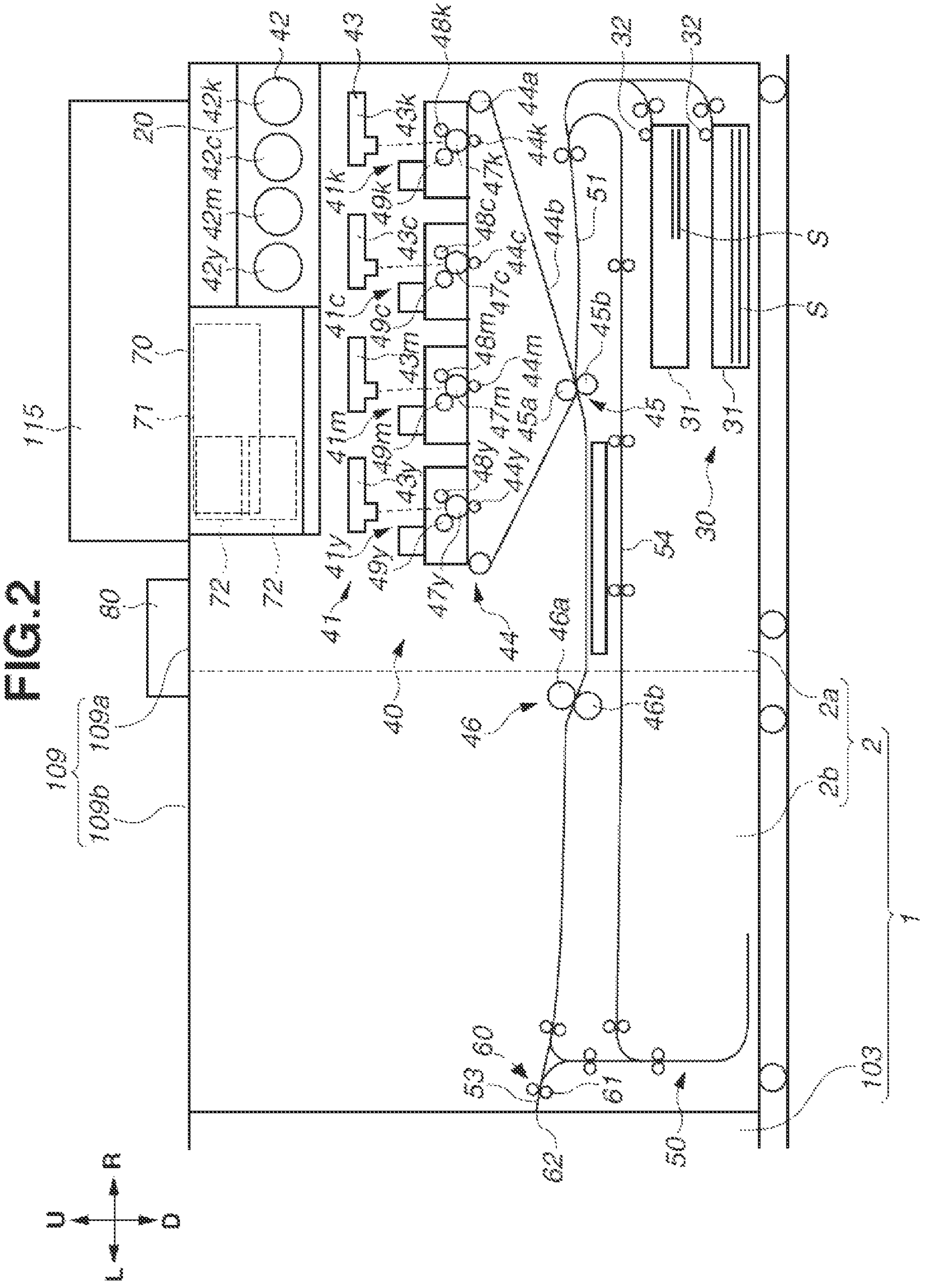
FIG. 2 is a schematic cross-sectional view illustrating a part of the image forming system.

As illustrated in FIG. 1, an image forming system 1 according to the present exemplary embodiment includes, for example, the image forming apparatus 2, which is a printer, and a post-processing apparatus 103 adjacently disposed in the left direction L of the image forming apparatus 2 and configured to stack sheets S (FIG. 2). According to the present exemplary embodiment, the image forming apparatus 2 and the post-processing apparatus 103 are defined as housings. A top surface 109 that can be used as a workspace is provided on the top face of the image forming apparatus 2. According to the exemplary embodiment, the area of the top surface 109 is larger than the maximum area of the sheet S on which the image forming apparatus 2 can form an image. The user spreads a drawing on the top surface 109 and performs work such as drafting. Therefore, the top surface 109 is configured to become horizontal on the assumption that the floor where the image forming system 1 is installed is horizontal.

In addition, the top surface 109 is configured to be flat as much as possible. A region 1010 illustrated in FIG. 4 (described below) is an example of a workspace. If the image forming system 1 is horizontally installed, the workspace 1010 also becomes horizontal. This region is flat since it is a part of the top surface 109. "A flat surface" refers to a surface other than connecting portions between members unavoidably formed in designing the exterior of the image forming system 1. This surface is designed to reduce grooves and other unevenness as much as possible. The workspace 1010 may be in a size that allows at least A3-size paper to be spread, in which a flat surface needs is secured. The top surface 109 is made of resin, for example, and is assumed to be a "flat surface" even if there is a certain wobble or waviness that unavoidably arises in production. The concept "horizontal" in this case includes not only "horizontal" in the strictly mathematical sense but also "approximately horizontal" that can be practically regarded as horizontal.

The present exemplary embodiment will be described below centering on a tandem full-color printer as an example of the image forming apparatus 2. However, the present disclosure is not limited to the tandem image forming apparatus 2 but may be image forming apparatuses of other types, for example, monochrome and monocolor image forming apparatuses.

As illustrated in FIG. 2, according to the exemplary embodiment, the image forming apparatus 2 as an example of the housing can be divided into two different portions: an image forming unit housing 2*a* and a conveyance unit housing 2*b*. The conveyance unit housing 2*b* conveys paper with an image formed thereon in the image forming unit housing 2*a* to the post-processing apparatus 103 (not illustrated). Each of the image forming unit housing 2*a* and the conveyance unit housing 2*b* is also an example of a housing. The image forming unit housing 2*a* has a top surface 109*a*, and the conveyance unit housing 2*b* has a top surface 109*b*. The image forming unit housing 2*a* and the conveyance unit housing 2*b* can be connected with each other. The top surfaces 109*a* and 109*b* can be connected to configure the flat top surface 109. The image forming unit housing 2*a* and the conveyance unit housing 2*b* can be connected and separated in this way. Therefore, for example, when conveying these housings to upper floors of a building, the housings can be separately loaded on an elevator and then conveyed to a destination floor. This enables easily conveying the image forming system 1 having a large full length and a large size to a destination floor in a building by using an elevator.

The image forming system 1 includes a toner supply unit 20, a sheet feeding unit 30, an image forming unit 40, a sheet conveyance unit 50, a sheet discharge unit 60, an electrical device unit 70, and an operation unit 80. A toner image is formed on the sheet S, which is a recording material. Specific examples of the sheet S include plain paper, a synthetic resin sheet as a substitute of plain paper, thick paper, and an overhead projector (OHP) sheet.

The sheet feeding unit 30 disposed at the bottom of the image forming apparatus 2 includes sheet cassettes 31 for storing sheets S in a stacked way, and feed rollers 32. The sheet feeding unit 30 is configured to feed the sheet S to the image forming unit 40.

The image forming unit 40 includes image forming units 41, toner bottles 42, exposure apparatuses 43, an intermediate transfer unit 44, a secondary transfer portion 45, and a fixing apparatus 46.

The image forming unit 41 includes four image forming units 41*y*, 41*m*, 41*c*, and 41*k* for toner colors yellow (y), magenta (m), cyan (c), and black (k), respectively, for forming a 4-color toner image. Each of these image forming units 41 can be attached to and detached from the image forming apparatus 2. For example, the image forming unit

41*y* includes a photosensitive drum 47*y* for forming a toner image, a charging roller 48*y*, a developing sleeve 49*y*, a drum cleaning blade (not illustrated), and toner. The image forming unit 41*y* is supplied with toner from a toner bottle 42*y* filled with toner, and toner bottle 42*m*, toner bottle 42*c*, and toner bottle 42*k* supply associated image forming units 41*m*, 41*c*, and 41*k*. Detailed descriptions of other image forming units 41*m*, 41*c*, and 41*k* having a similar configuration to that of the image forming unit 41*y*, such as including developing sleeves 49*m*, 49*c*, and 49*k*, except for the toner color will be omitted.

An exposure apparatus 43*y* is an exposure unit that exposes the surface of the photosensitive drum 47*y* to light to form an electrostatic latent image on the surface of the photosensitive drum 47*y*.

The intermediate transfer unit 44 is disposed in the downward direction D of the image forming units 41. The intermediate transfer unit 44 includes a drive roller 44*a*, a plurality of rollers such as primary transfer rollers 44*y*, 44*m*, 44*c*, and 44*k*, and an intermediate transfer belt 44*b* stretched on these rollers. The primary transfer rollers 44*y*, 44*m*, 44*c*, and 44*k* are disposed to face the photosensitive drums 47*y*, 47*m*, 47*c*, and 47*k*, respectively, so as to be in contact with the intermediate transfer belt 44*b*. When the intermediate transfer belt 44*b* is applied with a positive-polarity transfer bias by the primary transfer rollers 44*y*, 44*m*, 44*c*, and 44*k*, negative-polarity toner images on the photosensitive drums 47*y*, 47*m*, 47*c*, and 47*k* are sequentially transferred to the intermediate transfer belt 44*b* in an overlapped way. Thus, a full-color image is formed on the intermediate transfer belt 44*b*.

The secondary transfer portion 45 is formed of a secondary inner transfer roller 45*a* and a secondary outer transfer roller 45*b*. When the secondary outer transfer roller 45*b* is applied with a positive-polarity secondary transfer bias, the full-color image formed on the intermediate transfer belt 44*b* is transferred to the sheet S.

The secondary inner transfer roller 45*a* stretches the intermediate transfer belt 44*b* on an inner side of the intermediate transfer belt 44*b*. The secondary outer transfer roller 45*b* is disposed at a position facing the secondary inner transfer roller 45*a* across the intermediate transfer belt 44*b*.

The fixing apparatus 46 includes a fixing roller 46*a* and a pressure roller 46*b*. When the sheet S is pinched and conveyed between the fixing roller 46*a* and the pressure roller 46*b*, the toner image transferred on the sheet S is pressurized and heated to be fixed onto the sheet S. Although, in the present exemplary embodiment, the conveyance unit housing 2*b* includes the fixing apparatus 46, the present disclosure is not limited thereto. For example, the image forming unit housing 2*a* may include the fixing apparatus 46 but the conveyance unit housing 2*b* may not include the fixing apparatus 46. Of course, each of the housings may include a fixing apparatus.

The sheet conveyance unit 50 conveys the sheet S, fed from the sheet feeding units 30, from the image forming unit 40 to the sheet discharge unit 60. The sheet conveyance unit 50 includes a secondary pre-transfer conveyance path 51, a pre-fixing conveyance path, a discharge path 53, and a re-conveyance path 54.

The sheet discharge unit 60 includes a discharge roller pair 61 disposed on the downstream side of the discharge path 53, and a discharge port 62 disposed on the side face on the left direction L side of the image forming apparatus 2. The discharge roller pair 61 feeds the sheet S, conveyed from the discharge path 53, from the nip portion and discharges the sheet S from the discharge port 62. The discharge port 62 is able to feed the sheet S to the post-processing apparatus 103 disposed on the left direction L side of the image forming apparatus 2.

Figure 3:
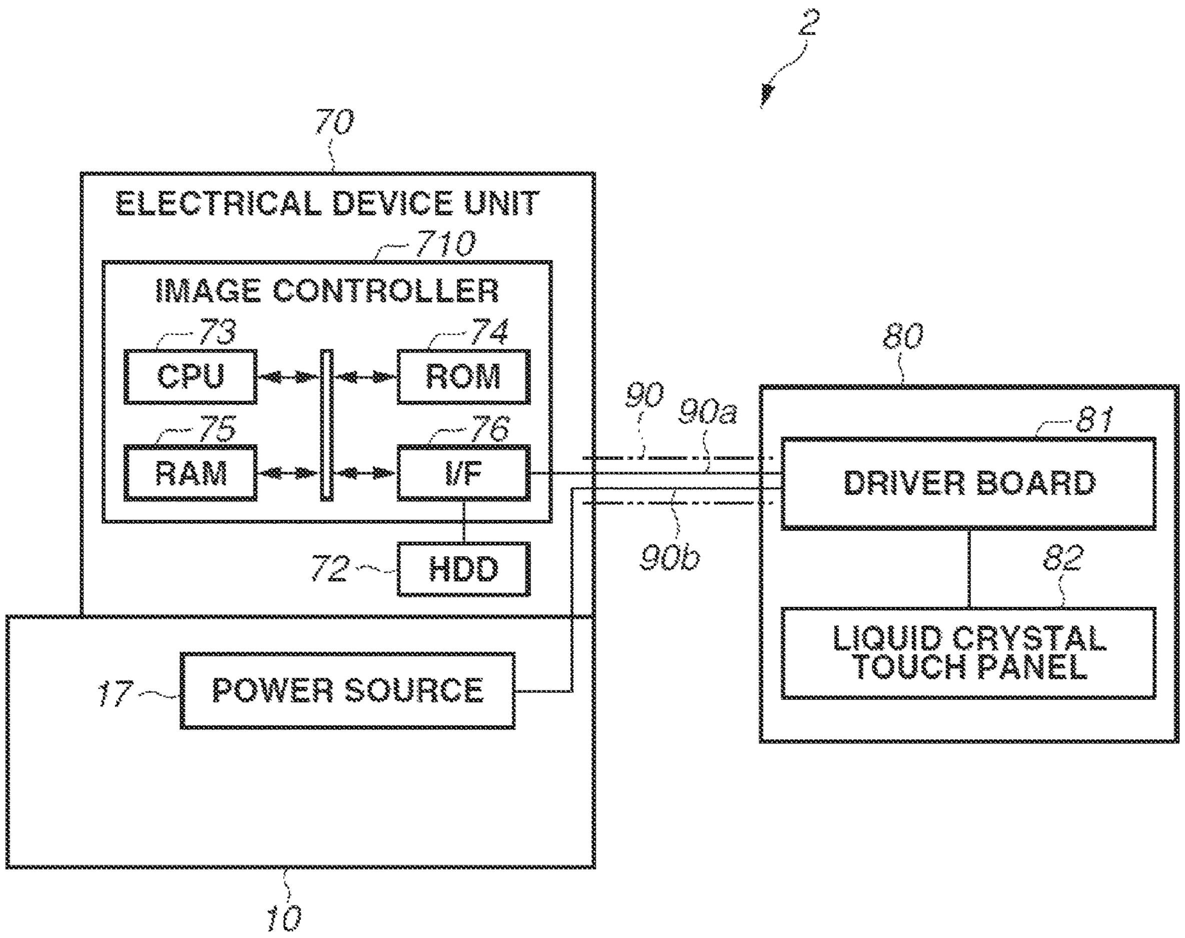
FIG. 3 illustrates a control configuration of the operation unit of the image forming system.

As illustrated in FIG. 3, the electrical device unit 70 includes an image controller 710, which is a control board including a control unit, and a hard disk drive (hereinafter referred to as an HDD) 72 as a removable mass storage device. The image controller 710 includes a computer, for example, a central processing unit (CPU) 73, a read only memory (ROM) 74 for storing programs that control each section, a random access memory (RAM) 75 for temporarily storing data, and an input/output circuit interface (I/F) 76 for outputting and inputting signals to/from the outside. The HDD 72 (FIG. 2 and FIG. 3) is a removable mass storage device for storing electronic data and can mainly accumulate image processing programs, digital image data, and supplementary information for the digital image data. At the time of image forming, the image data is read from the HDD 72.

The CPU 73 is a microprocessor that controls the entire image forming apparatus 2 and is the main component of a system controller. The CPU 73 is connected with the sheet feeding unit 30, the image forming unit 40, the sheet conveyance unit 50, the sheet discharge unit 60, the HDD 72, and the operation unit 80 via the input/output circuit 76. The CPU 73 exchanges signals with these units and controls the operations thereof. The image controller 710 enables the user to perform operations and make settings via an instruction from a computer (not illustrated) connected to the image forming apparatus 2 and an operation on the operation unit 80.

The operation unit 80 is provided separately from the image forming apparatus 2 to enable operation of each unit of the image forming apparatus 2. The operation unit 80 includes a driver board 81 and a display panel 82 (display unit). The display panel 82 displays information necessary for the user to operate the image forming apparatus 2, such as the remaining amount of sheets S supplied to the image forming apparatus 2, the remaining amount of toner, warning messages displayed when these consumables run out, and procedures for replenishing the consumables. The display panel 82 also accepts user operations for setting the size and grammage of the sheet S, adjusting the image density, and setting the number of sheets to be output.

The operation unit 80 is connected to the electrical device unit 70 of the image forming apparatus 2 via a cable 90. Although, in the above-described example, the cable 90 bundles a signal line 90*a* and a power line 90*b*, the signal line 90*a* and the power line 90*b* may be separate cables. The signal line 90*a* connects the input/output circuit 76 of the image controller 710 and the driver board 81. The power line 90*b* connects a power source apparatus 17 of a DCON control unit 10 (FIG. 3) of the image forming apparatus 2 and the driver board 81. More specifically, the signal line 90*a* transmits an execution signal from the driver board 81 (also referred to as a controller) of the operation unit 80 to the image controller 710 (also simply referred to as a controller) of the image forming apparatus 2. For example, the execution signal serves as a trigger signal that triggers an image forming unit 15 (FIG. 17) to perform image forming. When the user touches an icon (execution icon) displayed on the display panel 82 of the operation unit 80, the execution signal is transmitted from the driver board 81 to the image controller 710.

The image forming operation by the image forming apparatus 2 configured as described above will be described below.

When the image forming operation is started, the photosensitive drums 47y, 47m, 47c, and 47k rotate, and the surfaces of these drums are charged by the charging rollers 48y, 48m, 48c, and 48k, respectively. Then, the exposure apparatuses 43y, 43m, 43c, and 43k emit laser beams to the photosensitive drums 47y, 47m, 47c, and 47k, respectively, based on image information. Electrostatic latent images are formed on the surfaces of the photosensitive drums 47y, 47m, 47c, and 47k. When toner is applied to the electrostatic latent images, the electrostatic latent images are visualized as toner images and then transferred to the intermediate transfer belt 44b.

Meanwhile, in parallel with this toner image forming operation, the feed roller 32 rotates to separate and feed the uppermost sheet S in the sheet cassettes 31. Then, in synchronization with the toner image on the intermediate transfer belt 44b, the sheet S is conveyed to the secondary transfer portion 45 via the secondary pre-transfer conveyance path 51. Further, the image is transferred from the intermediate transfer belt 44b to the sheet S, the sheet S is conveyed to the fixing apparatus 46, the unfixed toner image is heated and pressurized to be fixed to the surface of the sheet S, and the sheet S is discharged from the discharge port 62 by the discharge roller pair 61 and then supplied to the post-processing apparatus 103.

Configuration of Operation Unit

Overview of the electrical device unit 70, the operation unit 80, the cable 90, a cover 101, and an opening 102 will be described below.

The electrical device unit 70 is provided on the rear face of the image forming apparatus 2. A connector (not illustrated) provided on one end of the cable 90 is connected to the electrical device unit 70. The cable 90 transmits a control signal for controlling the operation unit 80 from the electrical device unit 70 to the operation unit 80. The cable 90 has a function of communicably connecting the image forming apparatus 2 and the operation unit 80.

The other end of the cable 90 is provided with a connector (not illustrated) that is connected to the operation unit 80. The operation unit 80 is connected to the image forming apparatus 2 with a cable in this way but is not fixed to the top surface 109. Therefore, the user is able to freely place the operation unit 80 at an arbitrary position on the top surface 109 within a range of the cable extension. A "free" state in this case refers to a state where the operation unit 80 is not fixed to the top surface 109 with screws, for example. This means that the operation unit 80 is configured so that its position can be freely changed on the top surface 109.

According to the present exemplary embodiment, the image forming apparatus 2 and the operation unit 80 perform bidirectional communication via the cable 90. Therefore, as described above, the user is able to place the operation unit 80 at an arbitrary position within in the range of the length (a predetermined range) of the cable 90. In other words, the predetermined range refers to the movable range of the operation unit 80 in a state where the operation unit 80 and the cable 90 are connected with each other. More specifically, the predetermined range is determined by the length of the cable 90.

Therefore, for example, the movable range of the operation unit 80 can be adjusted by adjusting the length of the cable 90.

Other forms will be described in detail below as a fourth exemplary embodiment where a wireless communication method is adopted. In this case, the movable range of the operation unit 80 is not limited by the cable 90. In this case, the user is able to place the operation unit 80 at an arbitrary position within the range (a predetermined range) of the top surface 109. More specifically, the entire top surface 109 serves as the placement surface for the operation unit 80.

Thus, the operation unit 80 can be moved exceeding the range of the length of the cable 90. Even in this case, since the placement position of the operation unit 80 can be freely changed on the top surface 109, the operation unit 80 can be freely placed on the top surface 109.

Figure 4:
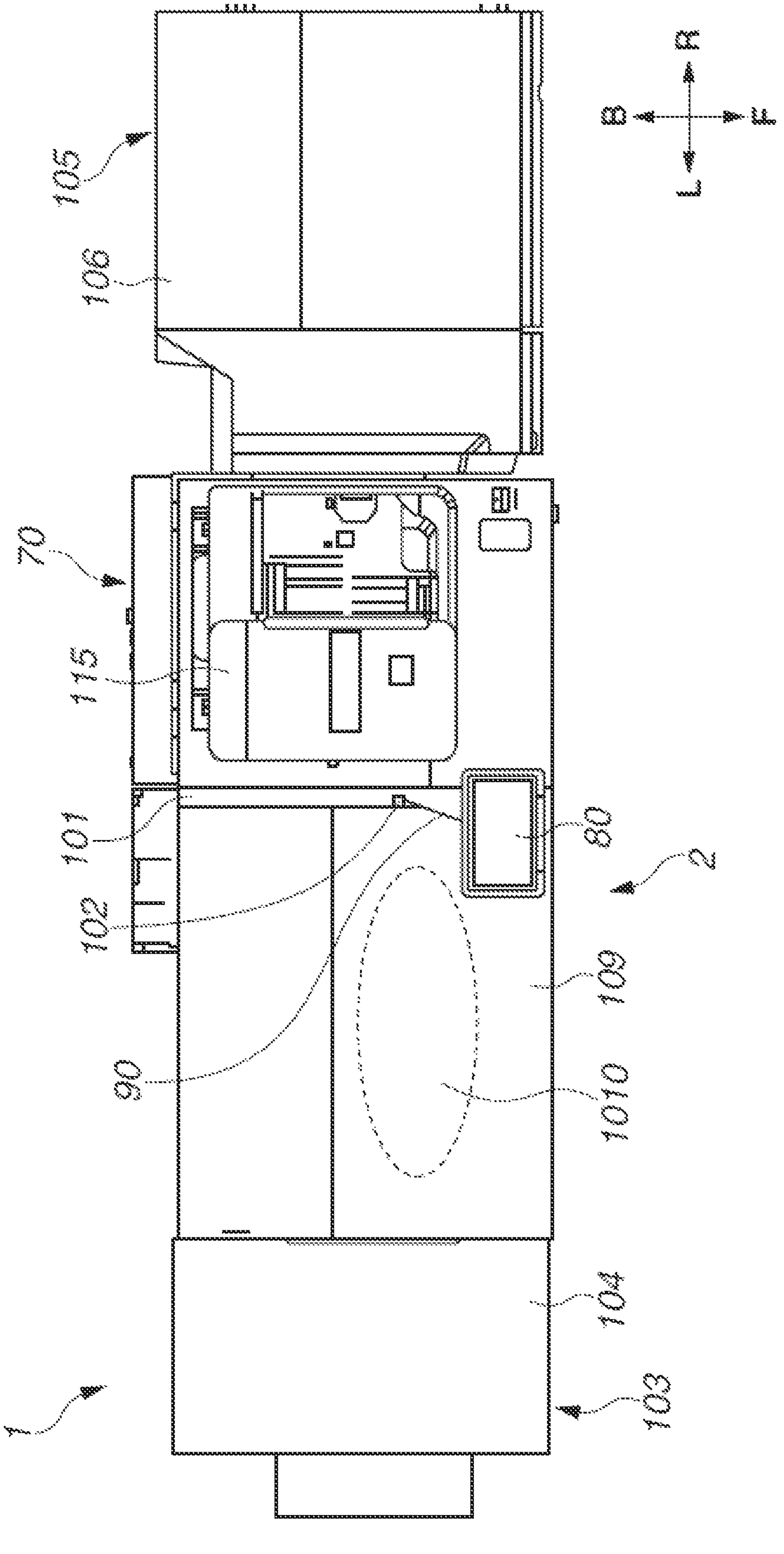
FIG. 4 illustrates an operation unit placed on the top surface of a housing, to the left of a reading apparatus.
Figure 5:
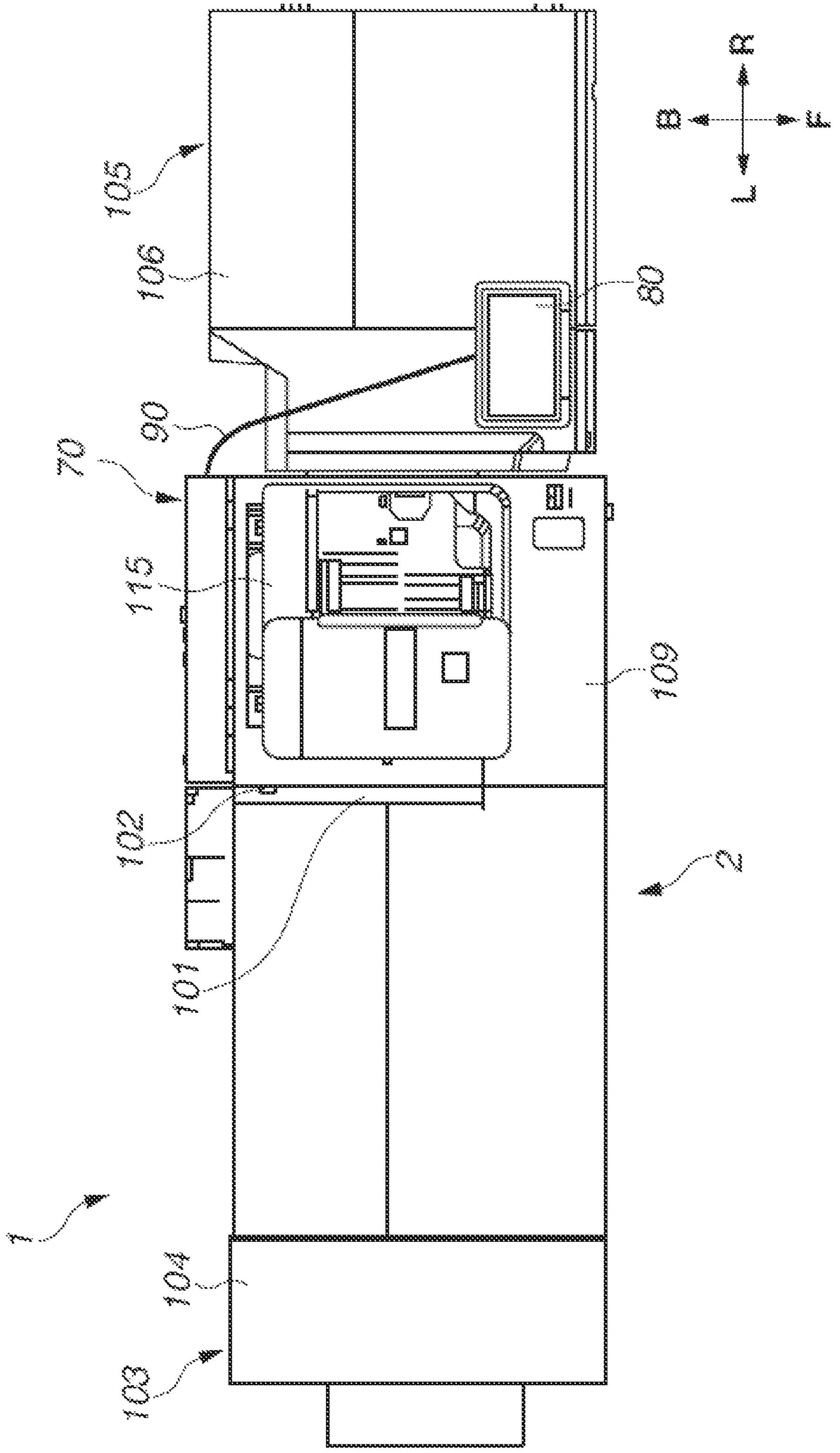
FIG. 5 illustrates the operation unit placed on the top surface of the housing, to the right of the reading apparatus.

FIGS. 4 and 5 illustrate the position on the top surface 109 where the operation unit 80 can be placed. For example, the operation unit 80 can be placed on a space close to a document reading apparatus 115 on the top surface 109 of the image forming apparatus 2, as illustrated in FIG. 4. The operation unit 80 can also be placed on a space on a top surface 106 of a sheet feeding apparatus 105, as illustrated in FIG. 5. Although not illustrated in FIGS. 4 and 5, the operation unit 80 can be placed on the top face of the image forming system 1, such as a top surface 104 of the post-processing apparatus 103. In addition, the operation unit 80 can also be placed on a space other than the top surface of the image forming system 1, for example, on a bench (not illustrated) disposed in the vicinity of the image forming system 1.

Figure 6A:
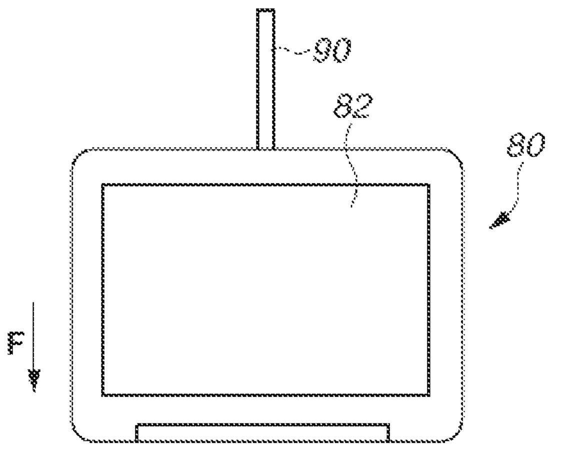
FIGS. 6A, 6B, and 6C illustrate the operation unit.
Figure 6B:
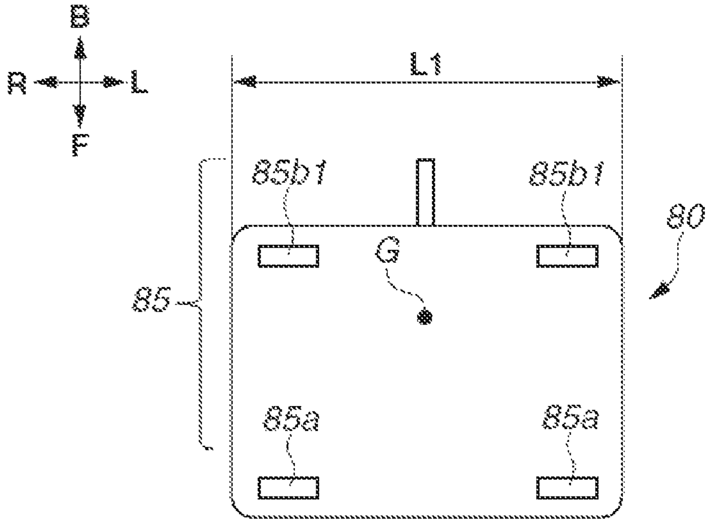
Figure 6C:
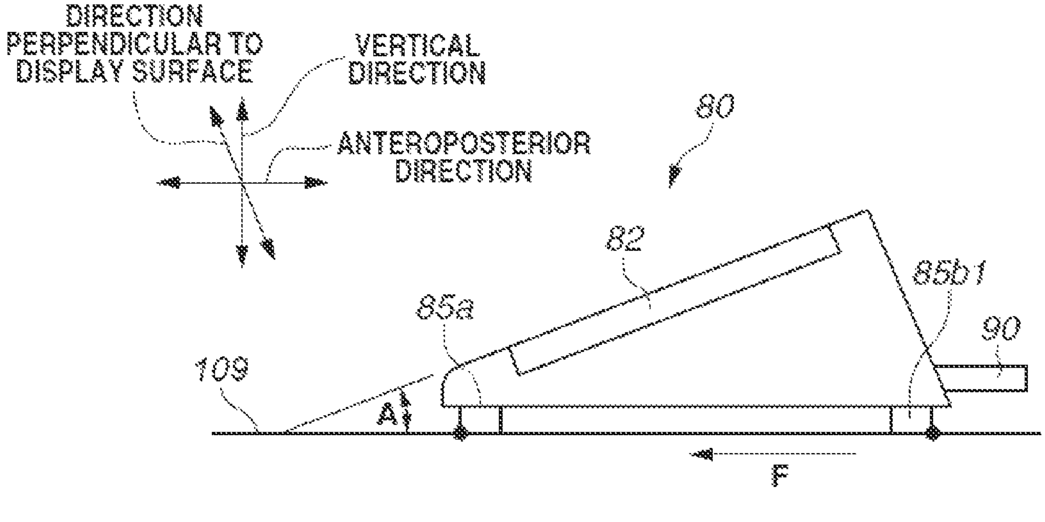

FIG. 6A illustrates the top face of the operation unit 80 viewed from above along the vertical direction. FIG. 6B illustrates the bottom face of the operation unit 80. FIG. 6C illustrates the side face of the operation unit 80.

As illustrated in FIG. 6A, the operation unit 80 has the display panel 82. The display panel 82 of the operation unit 80 according to the present exemplary embodiment is a liquid crystal touch panel. More specifically, the display panel 82 can accept touch operations by the user. Touch operations refer to operations of touching the display panel 82 with the fingertips, and include a flick and a scroll operation. The cable 90 extends from the back side of the operation unit 80. As illustrated in FIG. 6B, rubber bases 85 (85a and 85b1) as examples of elastic members are provided on the bottom face of the operation unit 80. The rubber bases 85 are also examples of a first to fourth contact portions (examples of a plurality of bases) and are portions in contact with the top surface 109. The rubber bases 85 are portions that come into contact with the top surface 109 when the operation unit 80 is placed on the top surface 109. The rubber bases 85 are made of an elastic member the surface of which has a high friction coefficient. The rubber bases 85 are configured to be slightly bent when the operation unit 80 is placed on the top surface 109. This makes it possible to support the operation unit 80 at four points as in the present exemplary embodiment. Mathematically, a plane is determined by three different points. All of the four points come in contact with the top surface 109 since one of the rubber bases 85 is bent. The operation unit 80 according to the present exemplary embodiment is provided with two rubber bases 85a on the front side of the operation unit 80, and two rubber bases 85b1 on the rear side thereof. The rubber bases 85 reduce the possibility of the operation unit 80 shaking when the user presses any portion of the display panel 82.

As illustrated in FIG. 6B, the four rubber bases 85 are disposed to surround the center of gravity G of the operation unit 80. In other words, the center of gravity G is located in the region surrounded by the four rubber bases 85. The four rubber bases 85 disposed in this way stably support the operation unit 80, improving the user's operability. When the operation unit 80 is viewed from above along the vertical direction, the rubber bases 85a are disposed on the upstream side of the center of gravity G, and the rubber bases 85b1 are disposed on the downstream side thereof in the direction perpendicular to both the front/back direction of paper (the direction perpendicular to both the direction perpendicular to a display surface 820 (FIG. 7A) and the vertical direction) and the direction perpendicular to a display surface 820, i.e., in the direction of climbing the slope of the display panel 82.

One of the two rubber bases 85*b*1 is disposed at the right-hand end on the bottom face of the operation unit 80, and the other thereof is disposed at the left-hand end on the bottom surface of the operation unit 80. It is assumed that the operation unit 80 placed on the top surface 109 is viewed from the bottom side of the operation unit 80. Therefore, the left-hand side of paper is defined as the right-hand side of the operation unit 80, and the right-hand side of paper is defined as the left-hand side of the operation unit 80. If the operation unit 80 is assumed to have a width L1 in the horizontal direction, it is desirable that one of the rubber bases 85*b*1 is disposed at the rightmost region (on one end side) and the other of the rubber bases 85*b*1 is disposed at the leftmost region (on the other end side) when the width L1 is divided into quarters. Disposing the two rubber bases 85*b*1 at a certain distance in this way enables improving the stability of the operation unit 80 placed on the top surface 109.

The horizontal direction in this case refers to the direction perpendicular to both the direction perpendicular to the display surface 820 (described below) and the vertical direction, and also is the width direction of the operation unit 80.

FIG. 6C illustrates the operation unit 80 placed on the top surface 109 viewed from the right-hand side of the operation unit 80. The surface on which the rubber bases 85 conform to the top surface 109 when the operation unit 80 is placed thereon is referred to as the rubber base surface, and is illustrated in FIG. 6C. As described above, in a case where the rubber bases 85 are made of a rigid member and the rubber bases 85 come into contact with the top surface 109 at the four positions, one of the four positions is lifted. This phenomenon is unavoidable in terms of the tolerance of parts. For this reason, all of the four rubber bases 85 conform to the top surface 109 if at least two of the four rubber bases 85 are elastic members. This enables the user to stably operate the operation unit 80 on the top surface 109.

An advantage of the cable 90 extending from the back side of the operation unit 80 will be described below with reference to FIG. 6C. As illustrated in FIG. 6C, the cable 90 extends from the operation unit 80 in the direction of climbing the slope of the display panel 82 when the operation unit 80 is viewed along the vertical direction. When the operation unit 80 is viewed along the vertical direction, the "extending direction" matches the direction perpendicular to both the front/back direction of paper (the direction perpendicular to both the direction perpendicular to the display surface 820 of the display panel 82 and the vertical direction) and the direction perpendicular to the display surface 820.

Since the cable 90 backwardly extends from the rear side of the operation unit 80, the connecting portion between the cable 90 and the operation unit 80 cannot be seen from the user operating the operation unit 80. This improves the designability of the operation unit 80.

Figure 7A:
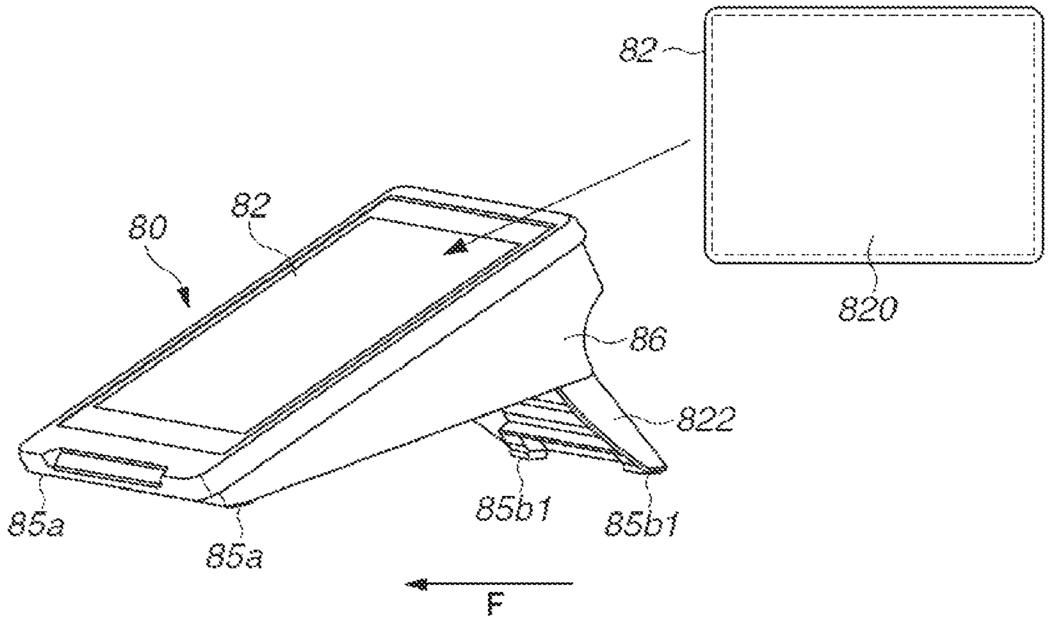
FIGS. 7A and 7B are schematic perspective views illustrating the operation unit.
Figure 7B:
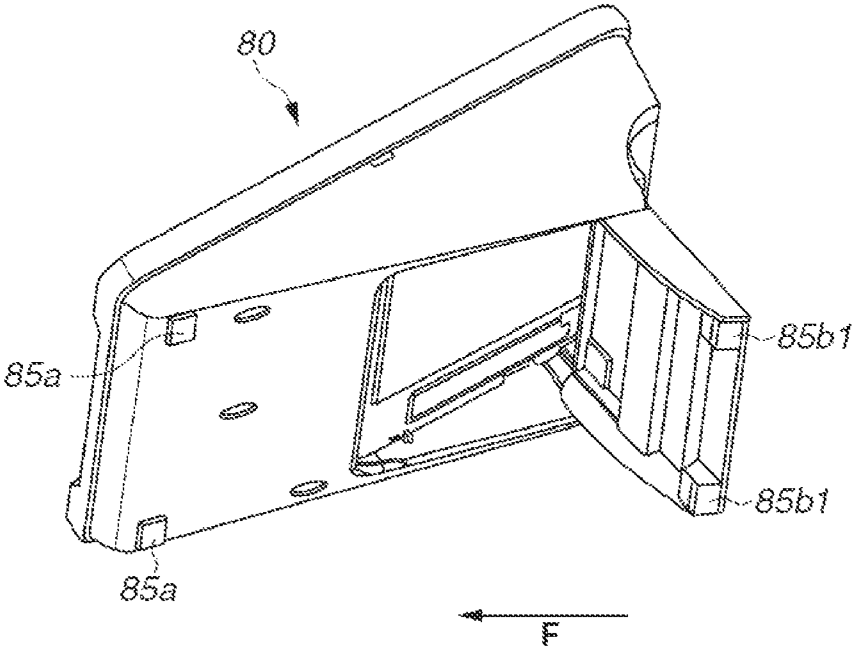

FIG. 7A is a perspective view illustrating the operation unit 80 and an enlarged view illustrating the display panel 82 (touch panel display). The display panel 82 displays icons (examples of execution icons) such as "Copy" and "Scan". When an icon displayed on the display panel 82 is touched, the execution signal is transmitted from the operation unit 80 to the image forming apparatus 2. As illustrated in FIG. 7A, the operation unit 80 is provided with a supporting base 86. The supporting base 86 supports the display panel 82. More specifically, when the operation unit 80 is placed on the top surface 109, the supporting base 86 supports the display panel 82 so that the display panel 82 forms a predetermined angle A (FIG. 6C) with respect to the top surface 109.

The supporting base 86 is also provided with the rubber bases 85 (85*a* and 85*b*1). More specifically, the rubber bases 85*a* are provided at the right and the left ends on the front side of the supporting base 86, and an arm 822 is provided on the rear side of the supporting base 86. The rubber bases 85*b*1 are provided at the right and the left ends of the arm 822. The angle of the display panel 82 with respect to the top surface 109 is determined when the four rubber bases 85 come into contact with the top surface 109.

The display panel 82 has the display surface 820 that displays a copy start button, a screen for setting the paper size, a screen for setting the number of print copies, a screen for displaying the remaining amount of toner, and information about image forming. Although, in the present exemplary embodiment, the display surface 820 is disposed on the portion excluding the edges of the display panel 82, information about image forming and a screen for print setting may be displayed on the entire surface of the display panel 82. However, in either case, the inclination angle of the display surface 820 with respect to the top surface 109 means the angle formed by an area near the center (the region corresponding to the display surface 820 in FIG. 7A) of the display panel 82 with respect to the top surface 109.

Figure 8A:
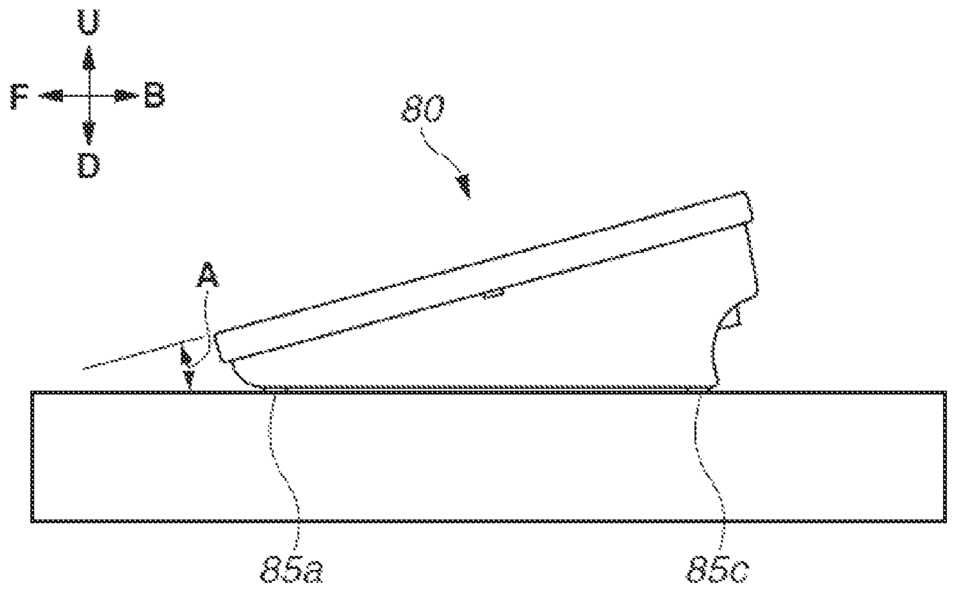
FIGS. 8A and 8B illustrate a mechanism of adjusting the inclination angle of the display panel with respect to the top surface.
Figure 8B:
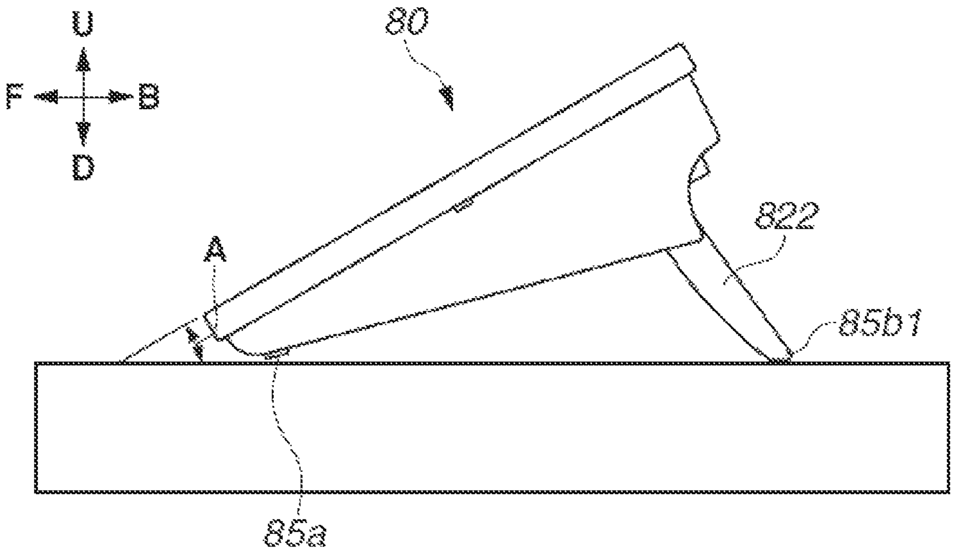

FIGS. 8A and 8B illustrate the function of the arm 822 disposed on the operation unit 80. FIG. 8A illustrates the operation unit 80 in a state where the arm 822 is retracted on the bottom side of the operation unit 80.

FIG. 8B illustrates the operation unit 80 in a state where the arm 822 is pulled out.

As illustrated in FIGS. 8A and 8B, the arm 822 rotatable with respect to the operation unit 80 is provided on the bottom side of the operation unit 80. The angle A of the display panel 82 with respect to the top surface 109 can be adjusted by retracting the arm 822 on the bottom side of the operation unit 80 (FIG. 8A) and pulling out the arm 822 (FIG. 8B). According to the present exemplary embodiment, this angle A is 30 degrees when the arm 822 is retracted on the bottom side of the operation unit 80, and 45 degrees when the arm 822 is pulled out. Since the angle A of the display panel 82 with respect to the top surface 109 can be adjusted in this way, the operation unit 80 is easy to use for various users with different heights of eye line, such as users on a wheelchair and tall users.

Effect of Providing Band (Insertion Member) on Operation Unit

A band will be described below as an example of an insertion member. Examples of applicable insertion members include a leather belt, a ring-shaped resin part, and a metal fixture.

When the operation unit 80 is configured to be freely placed on the top surface 109, like the present exemplary embodiment, the user is able to hold up the operation unit 80 in user's hand and then place it at an arbitrary position on the top surface 109. Some users may use the operation unit 80 not in a state of being placed on the top surface 109 but in a state of being held up in user's hand. For example, if the user feels that the texts or drawings displayed on the display panel 82 are small, the user may want to bring the eyes close to the display panel 82. In such a case, if the user tries to bring the eyes close to the display panel 82 of the operation unit 80 placed on the top surface 109, the user needs to bend down. Some users may feel it troublesome to take such a posture. Particularly, such users have a tendency to view and operate the display panel 82 with the operation unit 80 placed on the palm.

Although, in the above-described exemplary embodiment, communication between the operation unit 80 and the image forming apparatus 2 is performed via the cable 90, a form of wireless communication is also possible. A form of wireless communication will be described in detail below as the fourth exemplary embodiment. In such a form of wireless communication, the operation unit 80 is often operated at a position away from the image forming apparatus 2, and hence the user is assumed to use the operation unit 80 on the palm to a further extent.

Figure 9A:
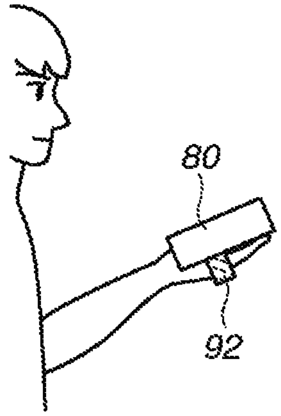
FIGS. 9A, 9B, and 9C illustrate an effect of attaching a band to the operation unit.
Figure 9B:
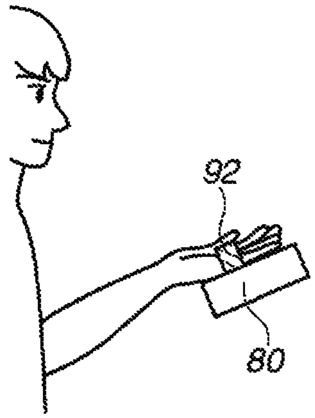
Figure 9C:
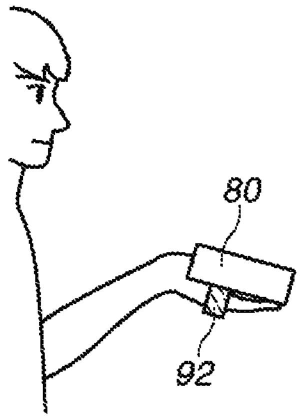

FIGS. 9A to 9C illustrate a use mode of the operation unit 80 using a band 92 (described below). In this example of a situation, the user operates the operation unit 80 at an angle of the display panel 82 of about 30 to 45 degrees with respect to the horizontal plane. More specifically, the user holds up the operation unit 80 with the palm oriented toward the face (FIG. 9A). As illustrated in FIG. 9A, there is no possibility of the operation unit 80 dropping from the palm in a state where the operation unit 80 is placed on the palm.

However, if the wrist is twisted in the state in FIG. 9A, i.e., if the palm is turned over in the state in FIG. 9A, the operation unit 80 will drop from the palm. If the wrist is slightly twisted, even without the palm being completely turned over, the operation unit 80 may possibly slip down from the palm. This may happen, for example, when the user shows the display panel 82 to have information displayed on the display panel 82 checked by another user next to the user. More specifically, in a possible case, print contents are previewed in the display panel 82 before being printed on paper, and the screen is shown to another user. In another possible case, settings including the number of print copies and two-sided/one-sided printing (information about image forming) are shown to another user. How much the wrist can be twisted before the operation unit 80 slips down from the palm depends on the palm condition and the material and shape of the bottom side of the operation unit 80 in contact with the palm. In any case, the operation unit 80 slips down at least before the palm is turned over. In a case where a user shows the display panel 82 to another user next to the user, the user may pay attention to the orientation of the palm so as not to let the operation unit 80 slip down from the palm or may unconsciously twist the wrist. In such a case, the operation unit 80 can be prevented from dropping from the palm when the wrist is twisted by putting the palm (fingertips) through the band 92 (describe in detail below). FIG. 9B illustrates a state where the wrist is turned over. Referring to FIG. 9B, since the user has turned over the palm completely, the operation unit 80 has slipped down from the palm. However, since the palm is put through the band 92, the band 92 is caught on the palm, preventing the operation unit 80 from dropping and hitting the floor.

FIG. 9C illustrates a state where the orientation of the palm is changed so that the fingertips are downwardly oriented. Even if the palm is put through the band 92, orienting the palm in this way may possibly allow the band 92 to fall off from the fingertips, and the operation unit 80 may slip down from the palm.

Accordingly, when showing the display panel 82 to the user next to him/her or a user facing him/her, the user needs to avoid showing the display panel 82 in the way illustrated in FIG. 9C. Although the band 92 according to the present exemplary embodiment reduces the possibility of the operation unit 80 slipping down from the palm, the operation unit 80 cannot be prevented from dropping if the fingertips are downwardly oriented. The band 92 according to the present exemplary embodiment is intended to reduce the possibility of the operation unit 80 slipping down from the palm when the wrist is turned over in a state where the fingertips are upwardly oriented.

Band Configuration (First Exemplary Embodiment)

Figure 10A:
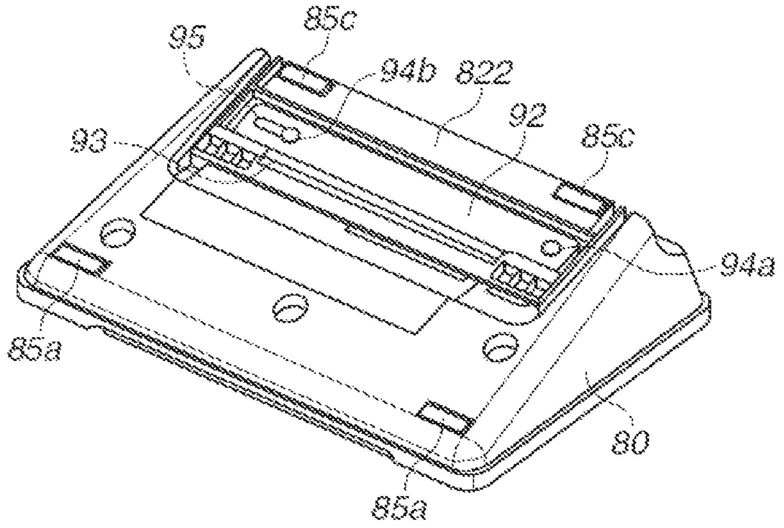
FIGS. 10A, 10B, and 10C illustrate the band attached to the operation unit.
Figure 10B:
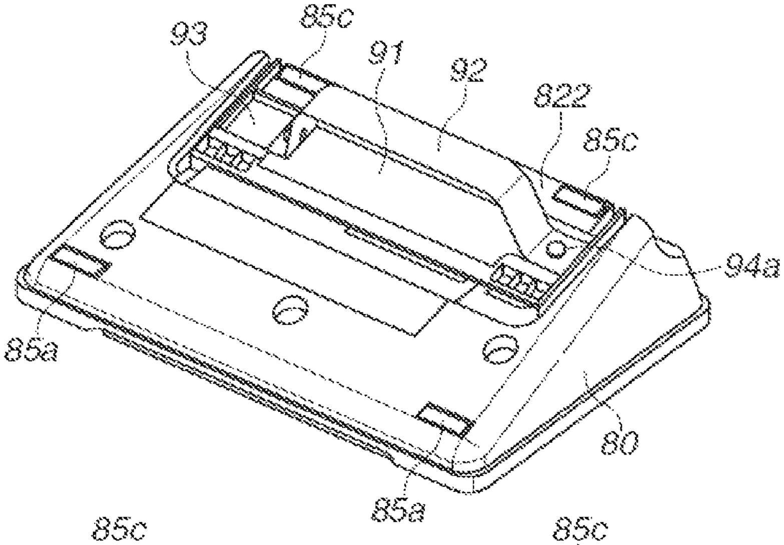
Figure 10C:
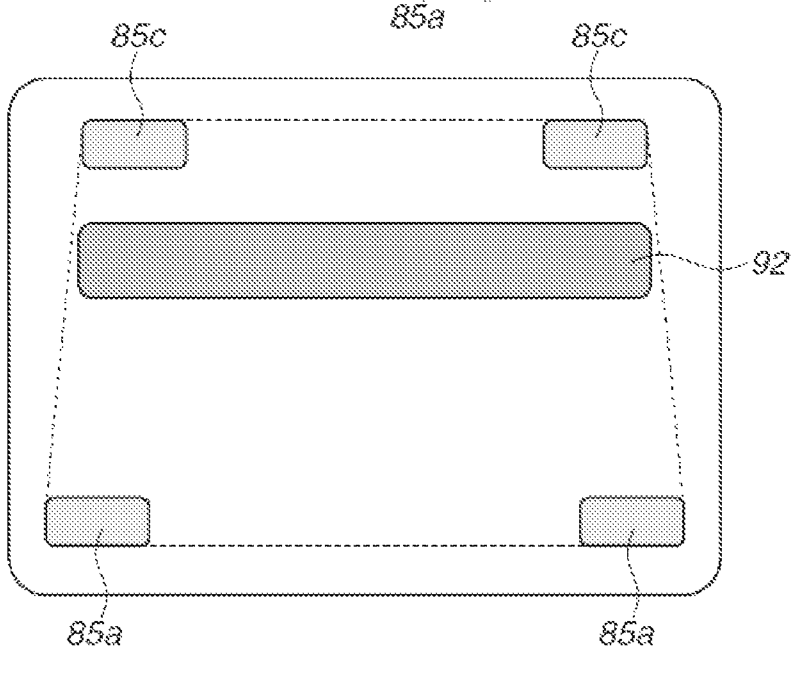

FIGS. 10A to 10C are perspective views illustrating the bottom side of the operation unit 80. The bottom side of the operation unit 80 refers to the side opposite to the side where the display panel 82 is provided. When the rubber bases 85 of the operation unit 80 are brought into contact with the top surface 109, the display panel 82 is upwardly oriented in the vertical direction. This state is defined as the normal operating state. The side upwardly oriented in this state, i.e., the side on which the display panel 82 is provided, is defined as the front side of the operation unit 80. In this state, the bottom side of the operation unit 80 is oriented toward the top surface 109.

FIG. 10A illustrates a state where the arm 822 is closed with respect to the operation unit 80, i.e., a state where the arm 822 is retracted on the bottom side of the operation unit 80. Further, the arm 822 is provided with a groove 93 formed to store the band 92. Thus, the groove 93 has a space for storing the entire band 92. In a state where the entire band 92 is stored in the groove 93, the band 92 does not protrude from the virtual plane determined by the rubber bases 85. The virtual plane is defined by selecting arbitrary three bases out of the rubber bases 85. The band 92 can be folded in this way. In the folded state, the band 92 is stored in the space within the height of rubber bases 85.

A state where the band 92 does not protrude from the virtual plane is defined as a state where the band 92 is stored in the groove 93. The size of the entire operation unit 80 including the band 92 (the volume occupying the space) when the band 92 is stored in the groove 93 is smaller than the size thereof in a state where the band 92 protrudes from the bottom side of the operation unit 80. More specifically, forming the groove 93 on the bottom side of the operation unit 80 enables downsizing the operation unit 80. The band 92 not protruded from the bottom side of the operation unit 80 also provides an effect of improving the appearance. If the band 92 partly protrudes from the bottom side of the operation unit 80 in a state where the operation unit 80 is placed on the top surface 109, a certain number of users may feel that the appearance is degraded. Since the band 92 can be stored in the groove 93 when the band 92 is not in use, the above-described degradation in appearance can be prevented. Further, when the band 92 is stored in the groove 93, the band 92 does not protrude from the virtual plane determined by the rubber bases 85. Accordingly, it is possible to reduce the possibility of the band 92 partly coming into contact with the top surface 109 and the operation unit 80 wobbling when the operation unit 80 is placed on the top surface 109. When the band 92 is not in use, i.e., when the operation unit 80 is not placed on the palm, the operation unit 80 is often placed on the top surface 109. The band 92 can be stored in the groove 93 formed on the bottom side of the operation unit 80. Therefore, even when the user operates the operation unit 80 on the top surface 109, the operation unit 80 can be used in a stable way without wobble.

Methods for putting the band 92 into and out of the groove 93 will be described below with reference to FIGS. 10A and 10B. As illustrated in FIGS. 10A and 10B, an oblong hole 95 is formed at one end side of the band 92. The one end side of the band 92 is fixed to the bottom side of the operation unit 80 by a screw 94*b* via the oblong hole 95. More specifically, the one end side of the band 92 can slide with respect to the operation unit 80 within the range of the oblong hole 95. The other end side of the band 92 is fixed to the bottom side of the operation unit 80 by a screw 94*a*. When one end side of the band 92 is slid toward the other end side, a central portion of the band 92 is bent. The bent portion of the band 92 protrudes from the groove 93, making it easier for the user to put the fingertips through the band 92. When the one end side of the band 92 is slid away from the other end side, the bent portion of the band 92 is stretched and the entire band 92 is stored in the groove 93. Although, in the present exemplary embodiment, only one end side of the band 92 is configured to be slidable with respect to the bottom side of the operation unit 80, both the one end side and the other end side may be configured to be slidable with respect to the bottom side of the operation unit 80.

As described above, if the band 92 is not configured in such a way that the one end side or both end sides of the band 92 is slidably attached to the bottom side of the operation unit 80, pushing the band 92 into the groove 93 when not in use may be considered as a method for storing the band 92. In such a method, the band 92 may partly protrude from the groove 93 by its own weight when the user holds up the operation unit 80. On the other hand, if the band 92 is configured in such a way that one end side or both end sides of the band 92 is slidably attached to the bottom side of the operation unit 80, it is possible to reduce the possibility that the band 92 partly protrudes from the groove 93 by its own weight when the user holds up the operation unit 80. To allow the band 92 to bend, one end side or both end sides of the band 92 need to slide with respect to the bottom side of the operation unit 80. However, a frictional force corresponding to the sliding is generated. The possibility that the band 92 protrudes from the groove 93 is low as long as the bending force by its own weight is smaller than the frictional force.

FIG. 10C illustrates an exterior cover on the bottom side of the operation unit 80. As illustrated in FIG. 10C (and FIG. 8A), the exterior cover of the operation unit 80 is provided with two rubber bases 85*a* and two rubber bases 85*c*. FIG. 10C illustrates the bottom side of the operation unit 80 viewed along the direction perpendicular to the plane determined by the four rubber bases 85*a* and 85*c*. A method for determining the plane has been described above with reference to FIGS. 6A to 6C.

As illustrated in FIG. 10C, the band 92 is located within the region surrounded by the four rubber bases 85*a* and 85*c*. When the operation unit 80 is placed on the top surface 109, the band 92 is stored between the top surface 109 and the exterior cover on the bottom side of the operation unit 80. For example, if the band 92 is leather, the bent band 92 has a restoring force to return to the shape before it was bent. Accordingly, the band 92 pushes up the operation unit 80 with respect to the top surface 109. In other words, the band 92 may function as the fifth base. If the fifth base is formed outside the region surrounded by the four rubber bases 85*a* and 85*c*, the orientation of the operation unit 80 placed on the top surface 109 may possibly be inclined. According to the present exemplary embodiment, the band 92 is provided within the region surrounded by the four rubber bases 85*a* and 85*c*. Thus, it is possible to reduce the possibility that the orientation of the operation unit 80 inclines even when the operation unit 80 is placed on the top surface 109.

Figure 11A:
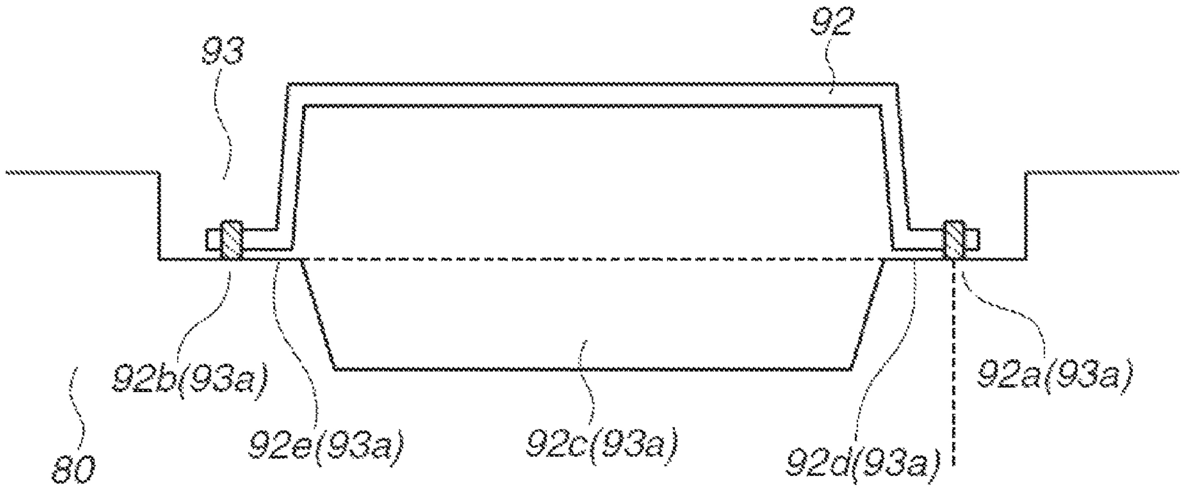
FIGS. 11A and 11B are enlarged views illustrating attachment portions of the band to the operation unit.

FIG. 11A is a cross-sectional view illustrating the operation unit 80. FIG. 11A is an enlarged view illustrating attachment portions of the band 92 to the bottom side of the operation unit 80 (attachment regions 92*a* and 92*b*). As illustrated in FIG. 11A, a bottom 93*a* of the groove 93 is provided with the attachment portions 92*a* and 92*b*, supporting regions 92*d* and 92*e*, and a depression 92*c*. The band 92 is attached to the bottom 93*a*. More specifically, the band 92 is attached to the attachment portions 92*a* and 92*b* of the bottom 93*a*. The depression 92*c* is formed between the attachment portion of the band 92 to the bottom side of the operation unit 80 at one end side of the band 92 (the attachment region 92*a*) and the attachment portion of the band 92 to the bottom side of the operation unit 80 at the other end side of the band 92 (attachment region 92*b*). The supporting regions 92*d* and 92*e* for supporting parts of the band 92 exist to the right and left of the depression 92*c*, respectively.

More specifically, the supporting regions 92*d* and 92*e* are adjacent to the depression 92*c*. When the bottom side of the operation unit 80 is upwardly oriented in the vertical direction, the depression 92*c* is located below the band 92. In this state, a part of the band 92 covers the depression 92*c*. The supporting regions 92*d* and 92*e* support parts of the band 92. Since the depression 92*c* more concave than the supporting regions 92*d* and 92*e* is formed at the bottom 93*a*, the user can easily put the fingertips through the band 92.

Figure 11B:
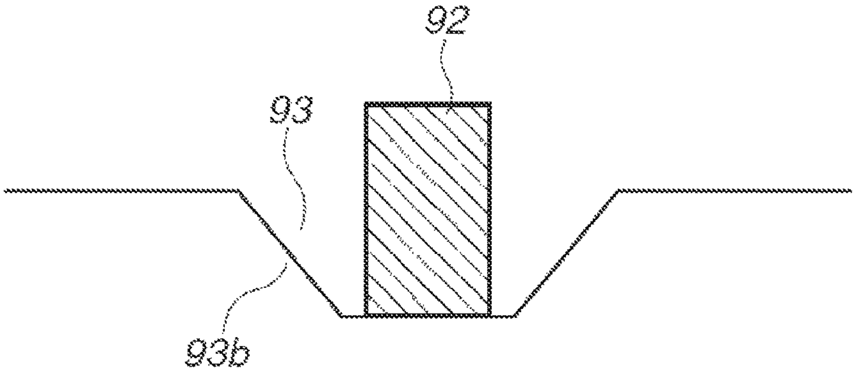

As illustrated in FIG. 11B, an inclined surface 93*b* is formed toward the bottom of the groove 93 more on the front side than the groove 93. The inclined surface 93*b* makes it easier for the user to put the fingertips into the groove 93 and then the depression 92*c* by sliding the fingertips along the inclined surface 93*b*.

When one end side and the other end side of the band 92 are slid all the way toward the center of the band 92, i.e., the band 92 is bent as much as possible, the space formed between the band 92 and the bottom side of the operation unit 80 is at least 30 mm in height and at least 90 mm in width. A space of this size enables the user to sufficiently put the palm between the band 92 and the bottom side of the operation unit 80. The operation to “put the palm through the band” is defined as an operation to put the four fingers other than the thumb (index finger, middle finger, annular finger, and little finger) through the band 92. The state where the palm is put through the band 92 refers to a state where the second joints of the index finger, middle finger, and annular finger, and the first joint of the little finger are put through the band 92. More specifically, the user operates the operation unit 80 in a state where the fingertips are put through the band 92. According to the exemplary embodiment, “the state where the palm is put through the band” and “the state where the fingertips are put through the band” means substantially the same state. According to the present exemplary embodiment, the space formed between the band 92 and the bottom side of the operation unit 80 is 35 mm in height and 100 mm in width.

Figure 12:
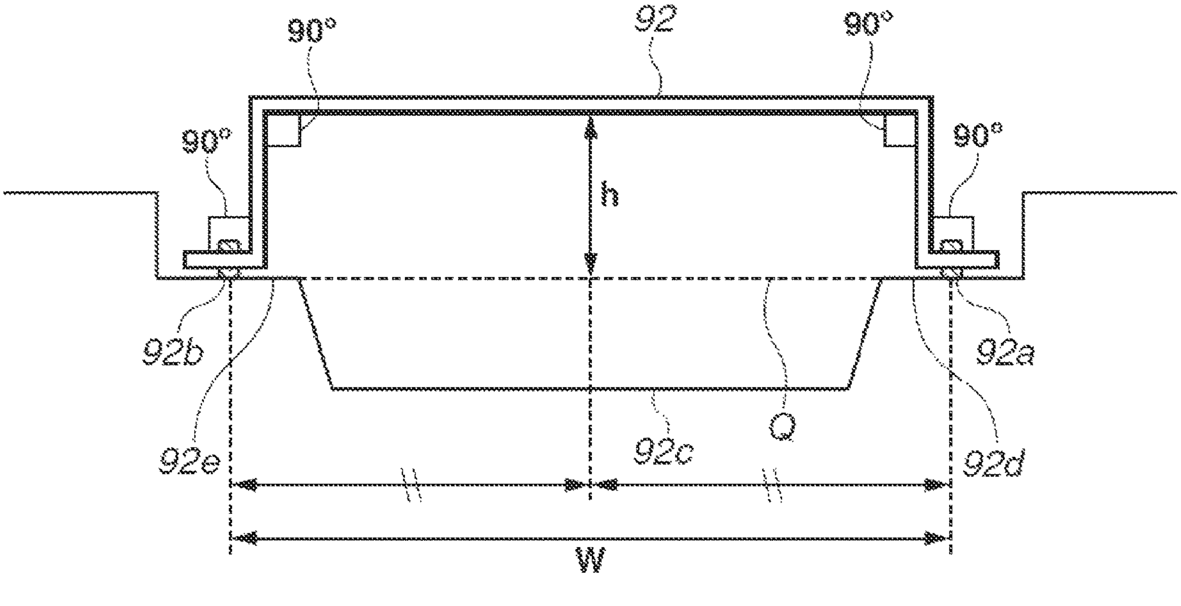
FIG. 12 illustrates a space formed by the band.

As illustrated in FIG. 12, the height (h) of the space is determined by the height from the virtual line Q connecting the supporting regions 92*d* and 92*e* to the center of the band 92. The height of the space refers to the distance from the center point of the virtual line Q to the intersection between the line perpendicular to the virtual line Q and the band 92. The width (W) of the space refers to the value determined by the distance from the attachment portion of the band 92 to the bottom side of the operation unit 80 at one end side of the band 92 to the attachment portion of the band 92 to the bottom side of the operation unit 80 at the other end side of the band 92. When the height and width of the space are measured, as illustrated in FIG. 12, the band 92 is bent so that the shape of the space becomes a rectangular parallelepiped. The space formed in this way is the space through which the user puts the palm.

According to the experiment of the inventor, 35 mm and 100 mm were obtained as most suitable values of the height and width of the space, respectively, based on the size of the user's palm. As described below, it is preferable that the height falls within a range from 30 to 60 mm and the width falls within a range from 90 to 180 mm depending on the material of the band 92. If the height and width of the space are small, the palm of some users does not fit into the space. From this viewpoint, lower limits of the height and width of the space are determined to be 30 mm and 90 mm, respectively. On the other hand, if the height and width of the space are too large, the operation unit 80 slides along the palm by a large moving amount when the user twists the wrist. This increases the possibility of the band 92 slipping down from the palm. From this viewpoint, upper limits of the height and width of the space are determined to be 60 mm and 180 mm, respectively.

The band 92 according to the present exemplary embodiment is mainly composed of nylon having some elasticity which is not as large as that of rubber. This intends to minimize the tightening on the palm felt by the user who puts the palm between the band 92 and the bottom side of the operation unit 80. Since the users have various sizes of the palm, some users mind the tightening on the palm by the band 92. Accordingly, the band 92 according to the present exemplary embodiment is a nylon band having elasticity not as large as that of rubber.

Meanwhile, the use of rubber as the material of the band 92 enables reducing the possibility of the operation unit 80 slipping down from the palm. More specifically, the use of rubber reduces the possibility of the operation unit 80 sliding and slipping down from the palm when the user twists the wrist. The possibility of the state transition from the state in FIG. 9A to the state in FIG. 9B can be reduced. This ensures the stability of the orientation of the operation unit 80 on the palm. The material of the band 92 needs to be determined by comparing the degree of tightening on the palm by the band 92 with the stability of the orientation of the operation unit 80 on the palm.

Positional Relation Between Band and Cable

Figure 13A:
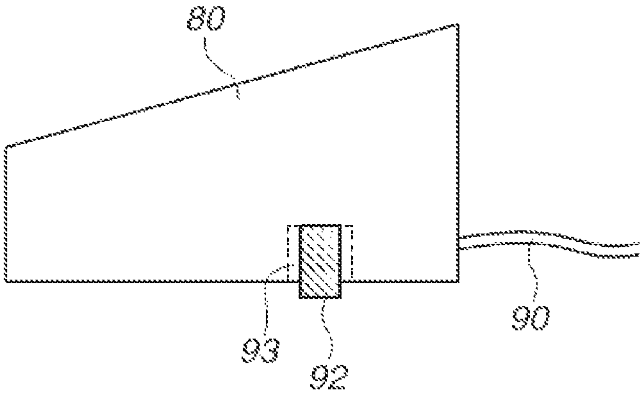
FIGS. 13A and 13B illustrate the positional relation between the band and a cable.
Figure 13B:
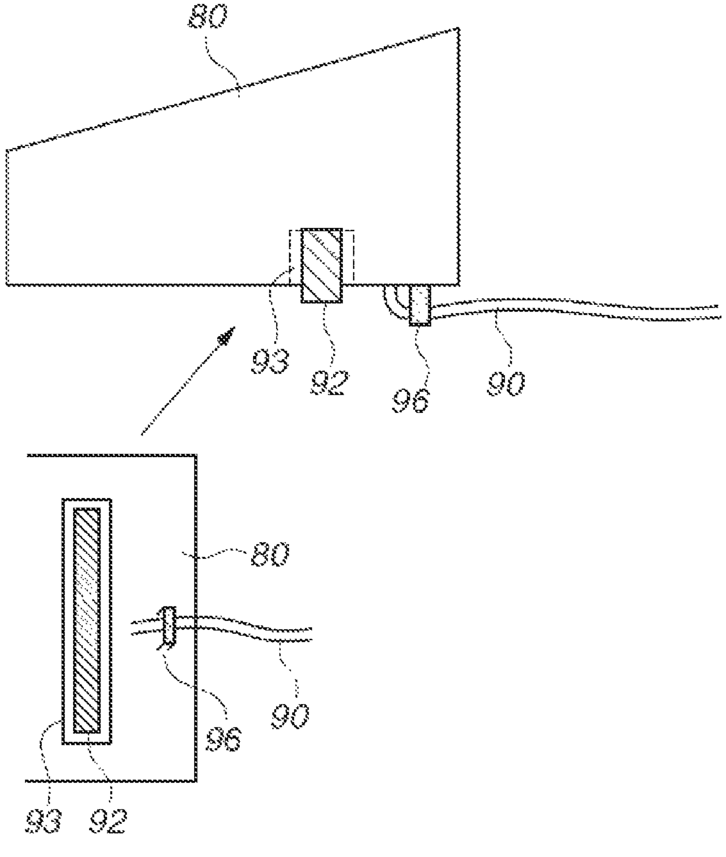

FIGS. 13A and 13B illustrate the positional relation between the band 92 and the cable 90. FIG. 13A is a schematic view illustrating the operation unit 80 viewed from the left-hand side of the operation unit 80. Referring to the example in FIG. 13A, the cable 90 is lead out from the wall on the rear side of the operation unit 80.

The band 92 is provided on the bottom side of the operation unit 80. Therefore, when the user puts the palm through the band 92, the palm is in contact with the bottom side of the operation unit 80. The position where the cable 90 is lead out from the operation unit 80 is more on the rear side than the band 92. Therefore, there is an extremely low possibility that the cable 90 gets into the space between the user's palm put through the band 92 and the bottom side of the operation unit 80. If the cable 90 exists between the palm and the bottom side of the operation unit 80, it becomes difficult to stably place the operation unit 80 on the palm. Therefore, by disposing the band 92 on the bottom side of the operation unit 80 and leading out the cable 90 from the rear side of the operation unit 80 as described above, the operability of the operation unit 80 with the user's palm put through the band 92 improves.

The user can easily determine whether the position where the cable 90 is lead out from the operation unit 80 is more on the rear side than the band 92 by viewing the operation unit 80 placed on the top surface 109. Firstly, the user places the operation unit 80 on the top surface 109 and then takes the posture in which he/she normally uses the operation unit 80. More specifically, the user stands in the front of the image forming system 1. In this case, the cable 90 extends from the operation unit 80 toward the rear side of the image forming system 1. In this state, the user determines whether the position where the cable 90 is lead out from the operation unit 80 is more on the rear side than the band 92.

In the example in FIG. 13B, the cable 90 is lead out from the bottom side of the operation unit 80 and then lead toward the rear side of the operation unit 80. As illustrated in FIG. 13B, the cable 90 is lead out from the bottom side of the operation unit 80. The lead-out opening is formed more on the rear side than the groove 93 where the band 92 is attached. A retaining member 96 for retaining a part of the cable 90 to the operation unit 80 is disposed more on the rear side than the lead-out opening.

Since the retaining member 96 is disposed more on the rear side than the lead-out opening, the cable 90 extends from the lead-out opening toward the rear side of the operation unit 80. The interference between the band 92 and the cable 90 can be prevented by disposing the lead-out opening more on the rear side than the band 92 and disposing the retaining member 96 more on the rear side than the lead-out opening in this way. More specifically, it is possible to reduce the possibility of the cable 90 getting into the space between the user's palm put through the band 92 and the bottom side of the operation unit 80. This configuration also improves the operability of the operation unit 80 with the user's palm put through the band 92.

Band Premised on Passing of Fingers (Modification)

Figure 14A:
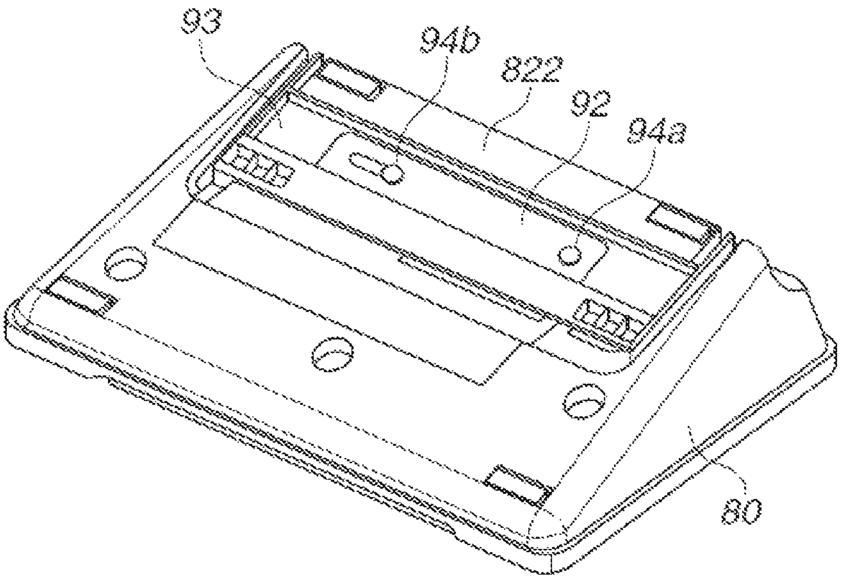
FIGS. 14A and 14B illustrate a configuration of the band attachment to the operation unit (modification).
Figure 14B:
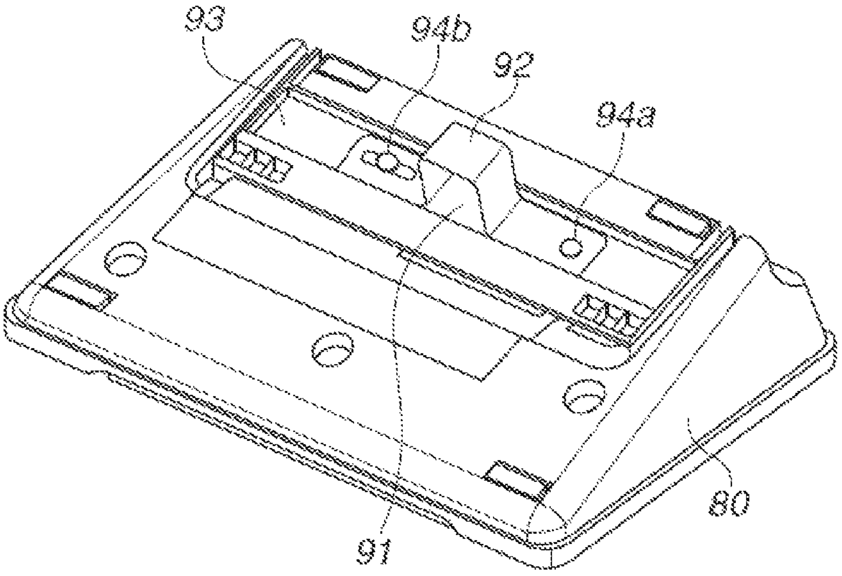

FIGS. 14A and 14B illustrate the band 92 disposed on the operation unit 80 on the assumption that one or two fingers are put through the band 92. The attachment configuration of the band 92 to the bottom side of the operation unit 80, and the slide configuration of the band 92 to the bottom side of the operation unit 80 are similar to the configurations according to the above-described first exemplary embodiment. The configuration of the present modification is different from that of the above-described first exemplary embodiment only in the size of the space formed between the band 92 and the bottom side of the operation unit 80.

The height and width of the space formed in the configuration according to the present modification are both 30 mm assuming that only one finger is put through the band 92, or 30 mm and 60 mm, respectively, assuming that two fingers are put through the band 92. The size of the space is determined for the same reason as that according to the first exemplary embodiment.

It is desirable that the height of the space falls within a range from 25 to 40 mm, and the width of the space falls within a range from 25 to 70 mm. The definition of the space measuring method is the also same as that according to the first exemplary embodiment.

Band Disposed at Positions Other Than Arm (Second Exemplary Embodiment)

Figure 15A:
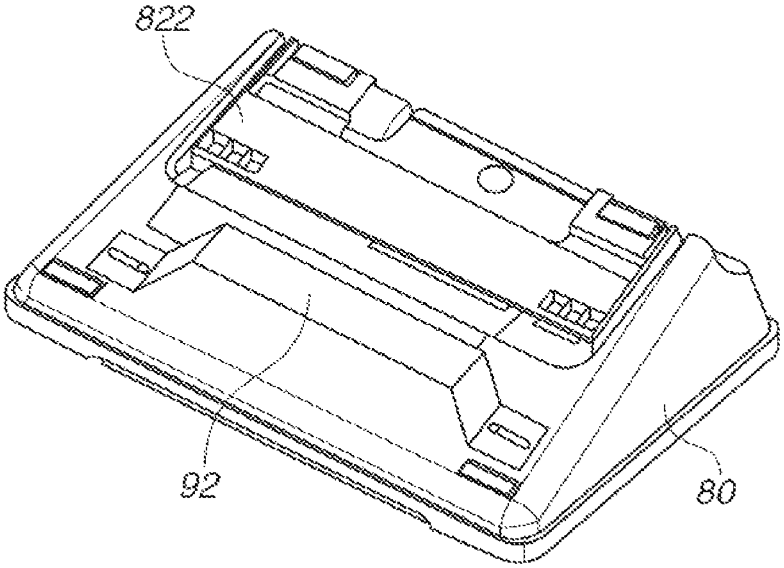
FIGS. 15A and 15B illustrate a configuration of the band attachment to a portion other than an arm (second exemplary embodiment).
Figure 15B:
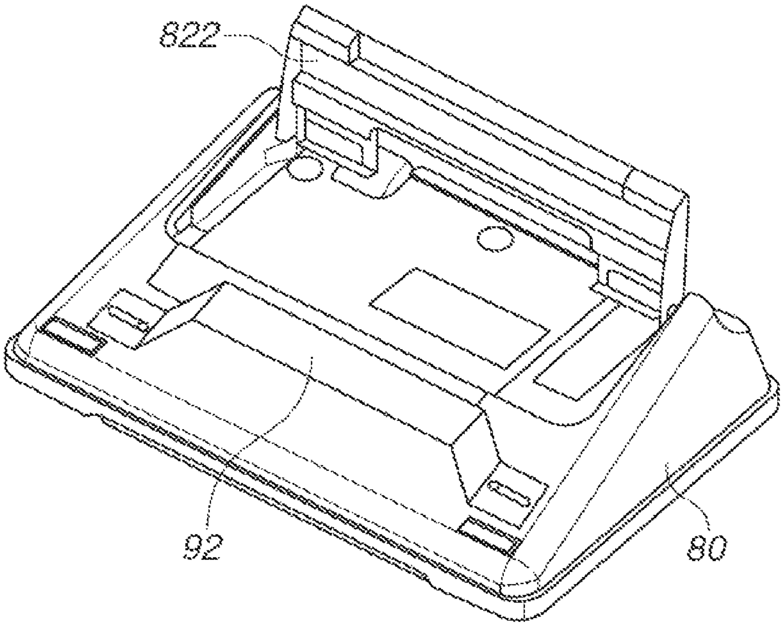

FIGS. 15A and 15B illustrate the configuration in which the band 92 is disposed at positions other than the arm 822. As illustrated in FIGS. 15A and 15B, the band 92 is attached to the bottom side of the operation unit 80 more on the front side than the arm 822. More specifically, the band 92 can also be attached to the operation unit 80 not having the arm 822.

Even with the operation unit 80 having the arm 822, the band 92 may be disposed at positions other than the arm 822. When the band 92 is disposed on the arm 822, the orientation of the arm 822 may slightly change when the user bends the fingers with the operation unit 80 placed on the palm. More specifically, when the relative positional relation between the arm 822 and the operation unit 80 changes, the relative positional relation between the palm and the operation unit 80 also changes. Some users may consider that the position change of the operation unit 80 on the palm is not desirable. Thus, according to the second exemplary embodiment, the band 92 is directly attached to the operation unit 80. The band 92 attached in this way provides a more stable orientation of the operation unit 80 on the palm.

On the other hand, from the viewpoint of design flexibility for the operation unit 80, the configuration of the second exemplary embodiment also has disadvantages. The operation unit 80 mounts a large number of parts including a circuit board, a touch panel, and a liquid crystal panel. In addition, it is demanded that the operation unit 80 is more compactly designed to improve the appearance and operability. More specifically, although the operation unit 80 needs to mount more parts to enhance its functions, the operation unit 80 needs to be designed to minimize the occupied volume. Forming the groove 93 for storing the band 92 and a position for fixing the band 92 on the operation unit 80 may cause limitations on the location of the circuit board inside the operation unit 80. More specifically, the design flexibility of the operation unit 80 decreases. The arm 822 includes no circuit board member and stores a small number of parts. Therefore, the arm 822 often provides more space for forming the groove 93 than the main body of the operation unit 80. As described above, from the viewpoint of orientation stability of the operation unit 80 on the palm, the configuration for directly attaching the band 92 to the operation unit 80 is more preferable than the configuration for providing the arm 822. On the other hand, from the viewpoint of the improvement in design flexibility of the operation unit 80, the configuration for attaching the band 92 to the arm 822 is more preferable than the configuration according to the second exemplary embodiment.

Arm Having Function of Band (Third Exemplary Embodiment)

Figure 16A:
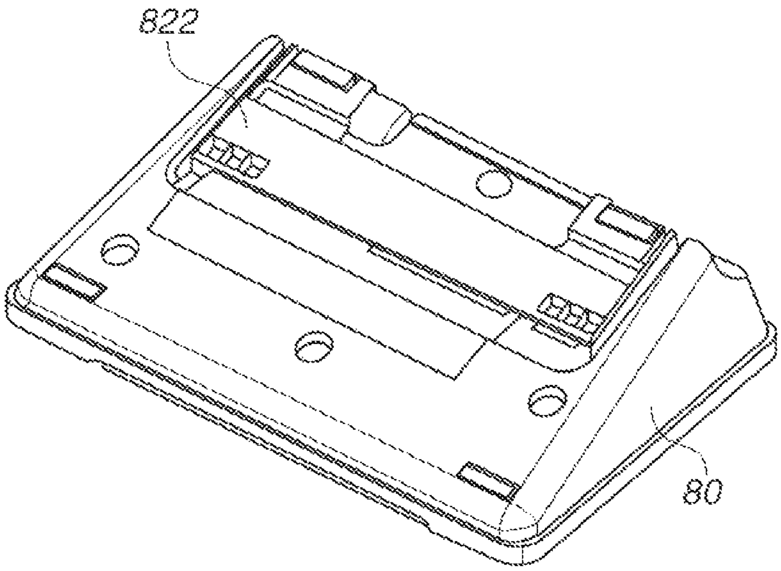
FIGS. 16A and 16B illustrate an arm having the function of a band (third exemplary embodiment).
Figure 16B:
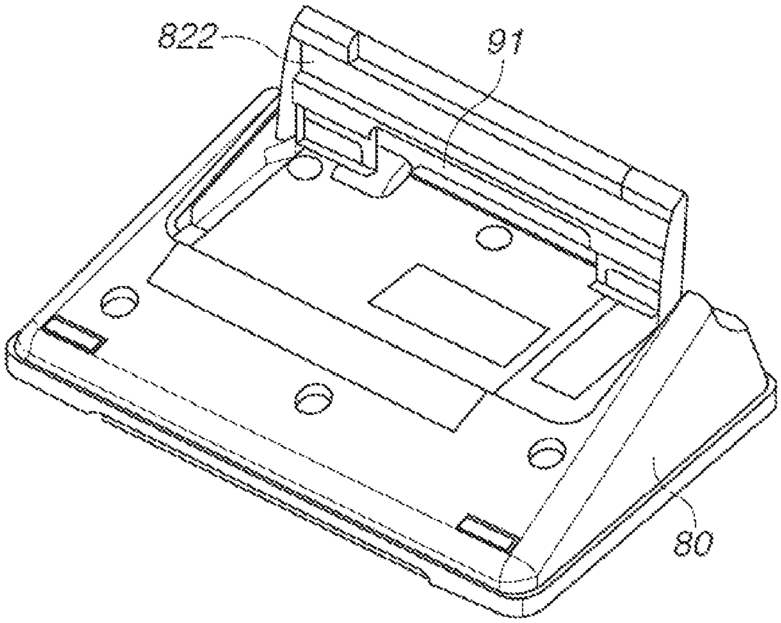

FIGS. 16A and 6B illustrate an example where the arm 822 has a function equivalent to the band 92. FIG. 16A is a perspective view illustrating the operation unit 80 with the arm 822 closed. FIG. 16B is a perspective view illustrating the operation unit 80 with the arm 822 opened. As illustrated in FIG. 16B, the arm 822 has an opening 91 formed near the center. The user is able to put the palm through the opening 91.

More specifically, when the user wants to hold the operation unit 80, the user opens the arm 822.

The size of the opening 91 is equivalent to the size of the space formed by the band 92 according to the first and the second exemplary embodiments.

Forming the opening 91 for putting the palm through the arm 822 itself in this way eliminates the need of providing a new member equivalent to the band 92. The arm 822 can be assigned a function of supporting the operation unit 80 and a function of a member through which the palm is put. This configuration reduces the number of parts and the production cost.

In the configuration according to third exemplary embodiment, on the other hand, the user needs to purposely open the arm 822 to put the palm through the opening 91. This configuration also has a disadvantage that the arm 822 itself is increased in size to ensure a sufficient size of the opening 91 to put the palm through the opening 91. Any limitation on the size of the arm 822 means the reduction in design flexibility of the arm 822. Using the band 92 as in the first and the second exemplary embodiments resolves the above-described disadvantages.

As described above, the configurations according to the first to the third exemplary embodiments have an effect of reducing the possibility of the operation unit 80 slipping down from the palm and hits the floor. Since each exemplary embodiment has advantages and disadvantages in addition to the above-described effect, the exemplary embodiments may be suitably used according to the required effect.

Operation Unit Capable of Wireless Communication (Fourth Exemplary Embodiment)

In the above-described exemplary embodiments, the operation unit 80 is connected to the image forming apparatus 2 via the cable 90. However, the operation unit 80 may wirelessly communicate with the image forming apparatus 2.

Figure 17:
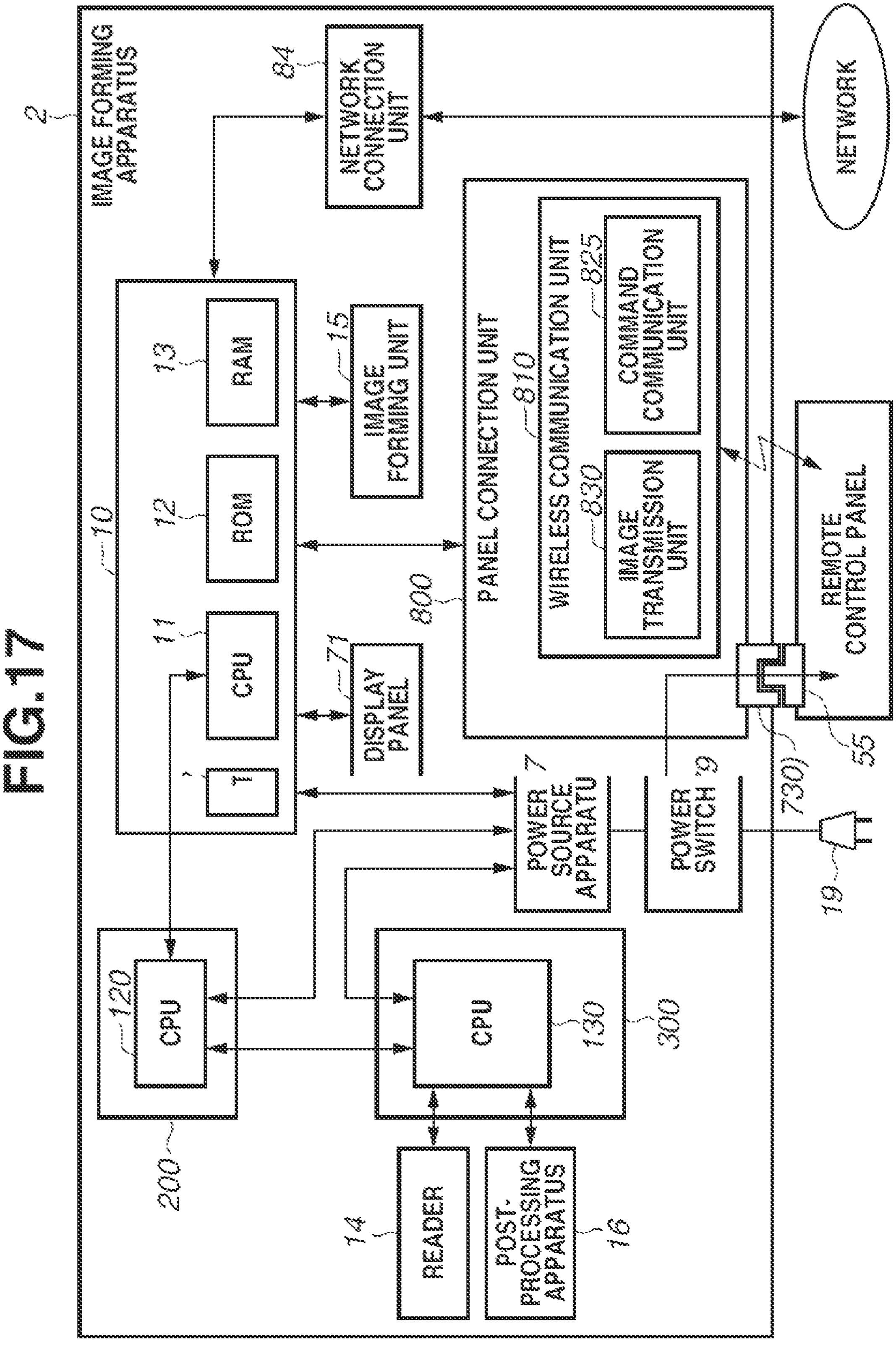
FIG. 17 illustrates a system configuration of an image forming apparatus capable of wirelessly communicating with the operation unit (fourth exemplary embodiment).

FIG. 17 illustrates a system configuration of the image forming apparatus 2 capable of wirelessly communicating with the operation unit 80. As illustrated in FIG. 17, the image forming apparatus 2 includes a DCON control unit 10, an SCON control unit 200, and an RCON control unit 300 as control units for controlling the image forming apparatus 2 when the power voltage is supplied from the power source apparatus 17.

The DCON control unit 10 controls various conveyance members, drive units such as motors for driving the image forming unit 15, and sensors such as a sheet detection sensor of the image forming apparatus 2. The SCON control unit 200 controls the entire image forming apparatus 2, more specifically, communication with an external apparatus via an interface (not illustrated) and image processing. For more details, the SCON control unit 200 is capable of receiving an image forming job, transmitting main body information for the image forming apparatus 2, and controlling image processing for an image read by a reader 14 and image data received from an external apparatus. The RCON control unit 300 performs various control for the reader 14 and the post-processing apparatus 16.

A state where a power switch 79 is turned ON means a state where the image forming apparatus 2 is activated. More specifically, this state is a state where the power source apparatus 17 is supplied with commercial power via an outlet, and power voltages are supplied from the power source apparatus 17 to the DCON control unit 10, the SCON control unit 200, and the RCON control unit 300.

When the image forming apparatus 2 is connected to a commercial power source, the power source apparatus 17 supplies a +5V power voltage to the SCON control unit 200 as a night power source. When the power switch 79 is turned ON, the power source apparatus 17 are capable of supplying a +12V and a +24V power voltage to the DCON control unit 10, the SCON control unit 200, and the RCON control unit 300 as non-night power sources. Although the present exemplary embodiment is configured to control the control units by supplying a plurality of different voltages thereto, the magnitudes and types of voltages are not limited to this configuration.

The DCON control unit 10 includes a CPU 11, a ROM 12, and a RAM 13 as built-in modules. The DCON control unit 10 is connected with the image forming unit 15 and a display panel 71 (FIG. 2 and FIG. 17). The DCON control unit 10 is also connected with a network connection unit 84 for connecting with external apparatuses (not illustrated) via a network.

The ROM 12 stores various image data and various programs for controlling the image forming apparatus 2. The CPU 11 executes various calculation processing based on the control programs stored in the ROM 12. The RAM 13 temporarily stores data. More specifically, the CPU 11 controls the image forming unit 15, the reader 14 connected to the CPU 130, and the post-processing apparatus 16 by using the RAM 13 as a work area based on the control programs stored in the ROM 12 to perform the above-described image forming operation.

The DCON control unit 10 is connected with a panel connection unit 800 for connecting with the operation unit 80. The panel connection unit 800 includes a power feed connector 730*a*, a panel attachment unit 730 to which the operation unit 80 is connected, and a wireless communication unit 810 that wirelessly communicates with the operation unit 80. The power feed connector 730*a* of the panel attachment unit 730 is connected with a charging connector 55 of the operation unit 80.

The wireless communication unit 810 includes a command communication unit 825 (transmission unit and reception unit) and an image transmission unit 830. The CPU 11 reads an image stored in the ROM 12 and then transmits the image to the operation unit 80 via the image transmission unit 830 of the wireless communication unit 810. The CPU 11 also generates an instruction to the operation unit 80 and transmits the instruction to the operation unit 80 via the command communication unit 825. The CPU 11 also receives a notification and instruction generated by the operation unit 80, via the command communication unit 825. Although, in the present exemplary embodiment, the command communication unit 825 and the image transmission unit 830 are configured as separate units, the two units may be integrated into a single communication line.

The image forming apparatus 2 and the operation unit 80 wirelessly communicate with each other via Wi-Fi (registered trademark) direct communication, which is a communication form of direct wireless connection between apparatuses. More specifically, in this example, the image forming apparatus 2 and the operation unit 80 wirelessly communicate with each other without a server's intervention. Miracast, a display transmission technique applied with the Wi-Fi direct communication method, is used for mobile phones, displays, and projectors. The wireless communication system is not limited to the Wi-Fi direct communication method but may be configured to, for example, perform wireless communication by using a Wi-Fi router as an access point. However, from the security viewpoint, the Wi-Fi direct communication method is preferable. Also, instead of the Wi-Fi wireless communication method, the wireless communication system may be configured to perform wireless communication based on other methods such as Bluetooth (registered trademark) and Near Field Communication (NFC).

"Remote access" is known as a method for accessing other electronic apparatuses and various types of servers on remote locations from an electronic apparatus such as a personal computer (PC) and tablet terminal. Examples of remote access forms include a Virtual Private Network (VPN) method. VPN refers to a mechanism for building a virtual dedicated network on the Internet. This system generally employs a method called "Tunneling" for performing communication by building a virtual tunnel during data transmission and reception. Further, a technique called "Encapsulation" may be used to protect data from vicious intrusion into the tunnel, thus maintaining security. Since a VPN-based communication method performs communication via the Internet as described above, it is different from the method of communication between the operation unit 80 and the image forming apparatus 2 according to the present exemplary embodiment.

Another method called a screen transmission method transfers the screen of a target electronic apparatus such as a PC and tablet terminal to the screen of the currently operating electronic apparatus via the Internet. When performing this screen transfer, electronic apparatuses are connected with VPN via a relay server.

The DCON control unit 10 is connected with the power source apparatus 17. The power source apparatus 17 receives power supplies from a commercial power source via an outlet plug 19, converts the power into power to be used in each device, and supplies the power to each device. More specifically, when the main power switch 79 is turn ON from OFF, the power source apparatus 17 supplies power to the DCON control unit 10. Subsequently, the power source apparatus 17 supplies power to the reader 14, the image forming unit 15, the post-processing apparatus 16, the display panel 71, the operation unit 80 attached to the panel attachment unit 730, the wireless communication unit 810, and the network connection unit 84 based on an instruction of the DCON control unit 10.

The SCON control unit 200 including a CPU 120 controls the system of the entire image forming apparatus 2 and image processing on an image read by the reader 14. Since the SCON control unit 200 controls the entire image forming apparatus 2, a +5V power voltage is constantly supplied when the image forming apparatus 2 is connected to a commercial power source.

Then, the RCON control unit 300 including a CPU 130 controls the reader 14 and the post-processing apparatus 16. The RCON control unit 300 outputs the image read via the reader 14 to the CPU 120. Thus, the CPU 120 generates image processing information to be used for image forming performed by the DCON control unit 10 by controlling drive motors.

The DCON control unit 10, the SCON control unit 200, and the RCON control unit 300 are not limited to the above-described configuration but may include an Application Specific Integrated Circuit (ASIC) and other CPUs to perform each control.

The image forming apparatus 2 according to the present exemplary embodiment is able to shift to a plurality of states such as a standby mode in which the image forming operation can be performed, and a sleep mode in which the power voltage supply to each control unit is limited, i.e., a power-saving state where the power consumption is lower than that in the state where the image forming operation is enabled. The standby mode refers to a state where the power switch 79 is turned ON, and the power voltages are supplied to the DCON control unit 10, the SCON control unit 200, and the RCON control unit 300. More specifically, the standby mode refers to a state where the power voltages are supplied to all of the control units and the image forming operation is enabled.

The sleep mode refers to a state where the power voltage is supplied to the SCON control unit 200 but no power voltages are supplied to the DCON control unit 10 and the RCON control unit 300.

The transition from the sleep mode to the standby mode and vice versa is performed when the user (operator or service engineer) operates a sleep key (not illustrated) provided on the operation unit 80. At this timing, when the sleep key of the operation unit 80 is operated, a sleep signal is output from the operation unit 80 to the power source apparatus 17. Thus, the power source apparatus 17 controls the DCON control unit 10, the SCON control unit 200, and the RCON control unit 300, and the image forming apparatus 2 enters the sleep mode. The image forming apparatus 2 may enter the sleep mode from the power switch ON state when no operation is made on the image forming apparatus 2 for a predetermined time period, i.e., a predetermined time period has elapsed since no image forming instruction is issued to the image forming apparatus 2. The predetermined time period in this case may be preset to 60 seconds, for example, or may be arbitrarily set by the user.

This predetermined time period is measured by a timer (counter) 202 controlled by the DCON control unit 10. The timer 202 measures the time period during which no image forming instruction is issued to the image forming apparatus 2 by the user. The timer 202 may measure the actual time or count a unique count value based on the actual time. When counting a count value, the timer 202 may count up (for example, 1 second, 2 seconds, 3 seconds, . . . ) or count down (for example, 60 seconds, 59 seconds, 58 seconds, . . . ). According to the present exemplary embodiment, the issuance of an image forming instruction to the image forming apparatus 2 refers to, for example, the transmission of a print job to the image forming apparatus 2. The timing when no image forming instruction is issued refers to the timing when the image forming processing by the image forming unit 15 is completed. More specifically, the timing when no image forming instruction is issued is the timing when photosensitive drums stop rotating. However, this timing is not limited to the timing when the photosensitive drums stop rotating but may be, for example, the timing when an intermediate transfer belt stops rotating or the timing when paper with a toner image transferred thereon is discharged to a discharge tray 16*a*.

Figure 18:
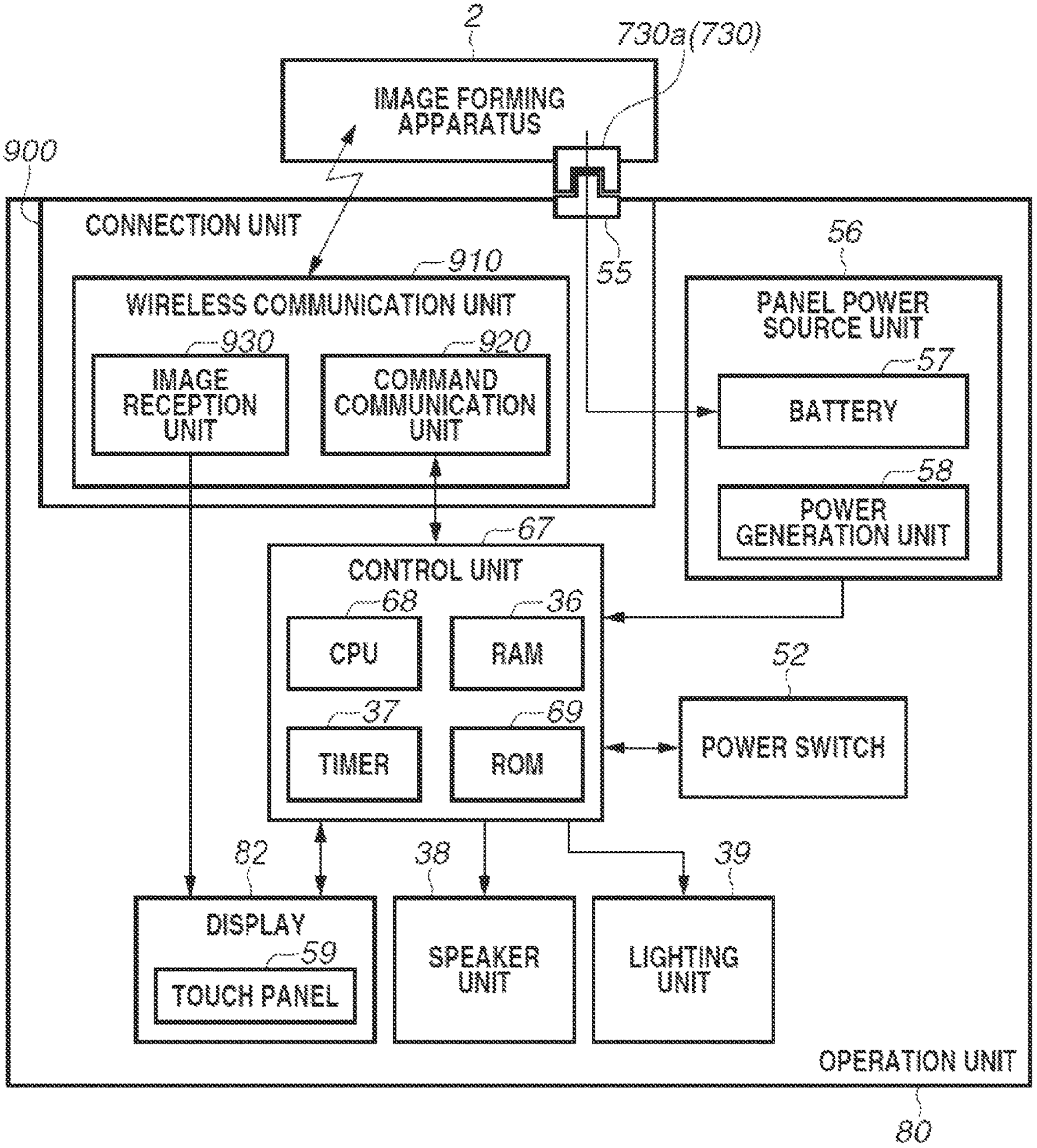
FIG. 18 illustrates a system configuration of an operation unit capable of wirelessly communicating with the image forming apparatus (fourth exemplary embodiment).

The system configuration of the operation unit 80 capable of wirelessly communicating with the image forming apparatus 2 will be described below. FIG. 18 illustrates a system configuration of the operation unit 80. As illustrated in FIG. 18, the operation unit 80 includes a control unit 67 including a CPU 68, a ROM 69 (storage unit), a RAM 36, and a timer 37. The timer 37 measures time when the control unit 67 performs various processing.

The ROM 69 stores data such as various programs for controlling the operation unit 80. The CPU 68 performs various calculation processing based on the control programs stored in the ROM 69. The RAM 36 temporarily stores data. More specifically, the CPU 68 controls a display 82, a speaker unit 38, and a lighting unit 39 connected to the control unit 67 by using the RAM 36 as a work area based on the control programs stored in the ROM 69.

The operation unit 80 includes a connection unit 900 for connecting with the image forming apparatus 2.

The connection unit 900 includes a charging connector 55 to be connected to the power feed connector 730*a* of the image forming apparatus 2, and a wireless communication unit 910 that wirelessly communicates with the image forming apparatus 2.

The wireless communication unit 910 includes a command communication unit 920 connected to the CPU 68, and an image reception unit 930 connected to the display 82. The CPU 68 generates an instruction or notification for the image forming apparatus 2, and transmits the instruction or notification to the command communication unit 825 (FIGS. 17 and 19) of the image forming apparatus 2 via an antenna (not illustrated) of the command communication unit 920. The CPU 68 receives an instruction and information transmitted from the command communication unit 825 of the image forming apparatus 2 via the command communication unit 920.

The image reception unit 930 receives image data transmitted from the image transmission unit 830 of the image forming apparatus 2 via an antenna (not illustrated), converts the image data into image data to be displayed on the display 82, and displays the image data on the display 82. Although, in the present exemplary embodiment, the command communication unit 920 and the image reception unit 930 are configured as separate units, the two units may be integrated into a single communication line.

The operation unit 80 also includes a panel power source unit 56. The panel power source unit 56 includes a battery 57 and a power generation unit 58. The battery 57 is the main power source of the operation unit 80 and includes a rechargeable battery. When a charging connector 55 is connected to the power feed connector 730*a* of the image forming apparatus 2, power is supplied from the power source apparatus 17 of the image forming apparatus 2 to the battery 57, and the battery 57 is charged. The power generation unit 58 also adjusts the power of the battery 57 to a voltage that can be used by each device included in the operation unit 80. When the power of a power switch 52 is turned ON from OFF, the battery 57 is charged, and the power adjusted by the power generation unit 58 is supplied to the control unit 67, the display 82, the speaker unit 38, the lighting unit 39, and the connection unit 900.

The wireless communication between the image forming apparatus 2 and the operation unit 80 will be described below.

Figure 19:
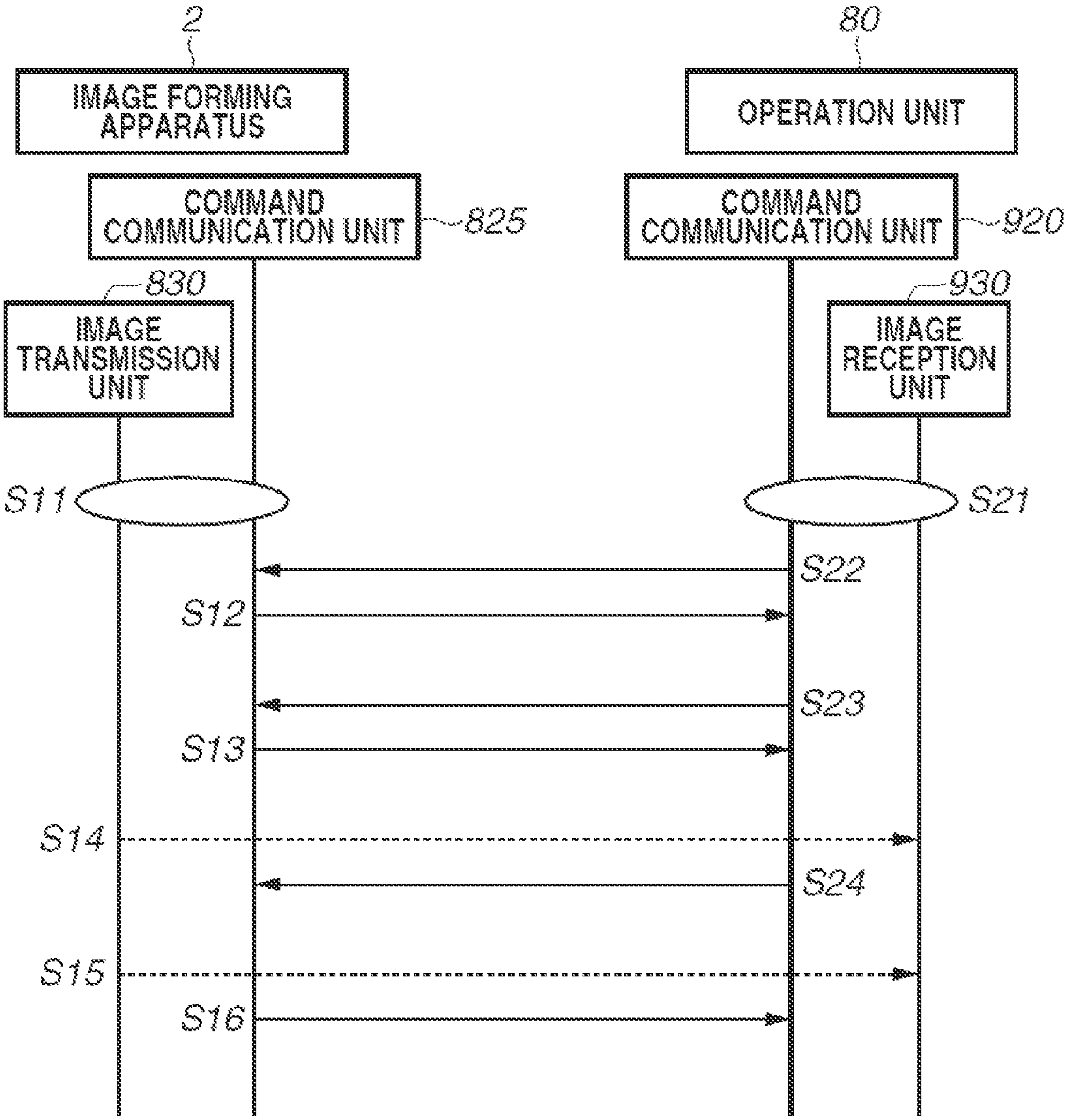
FIG. 19 illustrates a communication state transition in wireless communication.

FIG. 19 is a communication state transition diagram of the image forming apparatus 2 and the operation unit 80. A sequence of wireless communication between the image forming apparatus 2 and the operation unit 80 will be described. In step S11, the user operates the power switch 79 to activate the image forming apparatus 2. In step 521, the user operates a power switch 26 to activate the operation unit 80.

When the operation unit 80 is activated, then in step S22, the command communication unit 920 of the operation unit 80 transmits a negotiation request to the command communication unit 825 of the image forming apparatus 2.

In step S12, the command communication unit 825 of the image forming apparatus 2 transmits a response signal to the command communication unit 920 of the operation unit 80. When the operation unit 80 receives the response signal, the connection sequence ends and wireless communication is established.

In steps S13 and S23, the image forming apparatus 2 and the operation unit 80 mutually set wireless communication conditions, such as the transmission rate and the image compression ratio, via the command communication units 825 and 920. Upon completion of the wireless communication setting, then in step S14, the image transmission unit 830 of the image forming apparatus 2 transmits an image signal stored in the ROM 69 of the image forming apparatus 2 to the image reception unit 930 of the operation unit 80 according to an instruction of the CPU 11 of the image forming apparatus 2.

Then, the image reception unit 930 of the operation unit 80 converts the received image signal and displays the image on the display 82. When the user operates the display 82, then in step S24, the CPU 68 of the operation unit 80 transmits operation information of the display 82 to the command communication unit 825 of the image forming apparatus 2 via the command communication unit 920.

Figure 20:
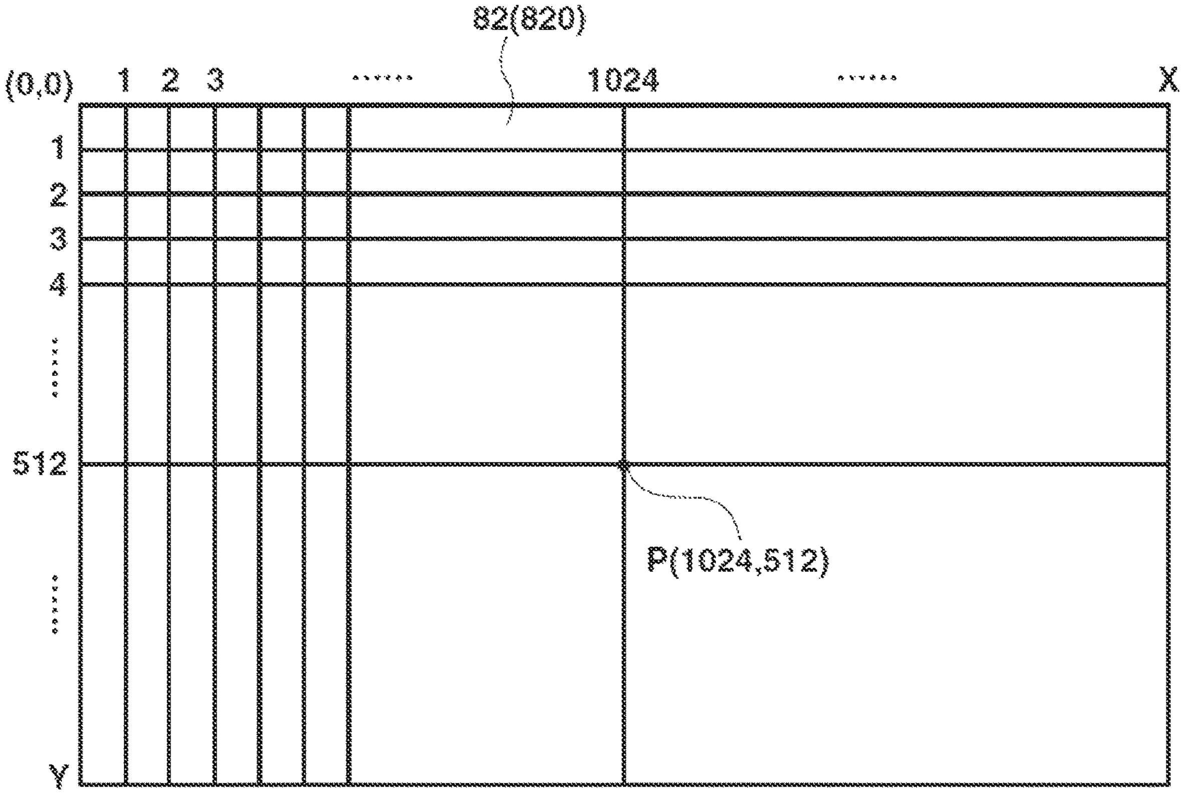
FIG. 20 illustrates a configuration of wireless communication.

The CPU 68 transmits the operation information of the display 82 to the image forming apparatus 2 as coordinate information. The coordinate information will be described below. FIG. 20 illustrates the display 82 of the operation unit 80 provided with coordinate display. As illustrated in FIG. 20, the display 82 is divided in each of the X- and the Y-directions. The number of divisions depends on the type of the touch panel. With the resistance type touch panel according to the present exemplary embodiment, the display 82 is divided into 2,048 in the X direction and 1,024 in the Y direction.

A position on the touch panel is represented by the coordinates (X, Y) according to the distance from the reference point, i.e., the origin (0, 0).

For example, referring to FIG. 20, a position P is located at 1,024 in the X direction and 512 in the Y direction from the origin, and is represented by the coordinates (1024, 512). Coordinate data is transmitted from the touch panel 59 of the display 82 to the CPU 68 of the operation unit 80, and then transmitted from the command communication unit 920 to the image forming apparatus 2 according to an instruction of the CPU 68. According to the present exemplary embodiment, since the communication between the image forming apparatus 2 and the operation unit 80 is based on the 8-bit length, the numerical value of the coordinate data is divided by 8 before transmission. More specifically, the coordinates (1024, 512) are replaced with (128, 64).

The CPU 11 of the image forming apparatus 2 determines the position on the display 82 of the operation unit 80 touched by the user based on input coordinate data. In steps S15 and S16, according to the touched position, the CPU 11 issues an instruction for transmitting image data, an instruction for lighting control for the lighting unit 25, and an instruction for turning the sound of the speaker unit 38 ON or OFF, to the operation unit 80. Also, at timing other than the reception of the operation information of the display 82 from the operation unit 80, the image forming apparatus 2 issues the above-described instructions to the operation unit 80 according to the states of the image forming apparatus 2 and the operation unit 80.

As described above, possible forms of the operation unit 80 include a form of wired communication and a form of wireless communication with the image forming apparatus 2. Either in a form of wired communication or in a form of wireless communication between the image forming apparatus 2 and the operation unit 80, the user can hold up the operation unit 80. Disposing the band 92 on the bottom side of the operation unit 80 enables reducing the possibility of the operation unit 80 slipping down from the palm and hitting the floor, regardless of whether the operation unit 80 employs a wired communication method or a wireless communication method.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming system comprising:

an image forming unit configured to form an image on a sheet;

a first housing having a top surface and a conveyance unit to convey the sheet;

an operation unit configured to receive a touch operation by a user, wherein the operation unit includes a second housing different from the first housing, a display capable of displaying information about image forming, and a band where the band is on a surface of the operation unit opposite to a surface on which the display is disposed and is configured to have a finger of the user be put through the band;

a control unit configured to control the operation unit; and a cable configured to connect the control unit and the operation unit, wherein the operation unit is able to be placed at an arbitrary position on the top surface of the first housing within an area corresponding to a length of the cable.

2. The image forming system according to claim 1, wherein the operation unit further includes a containing portion in which the band is contained.

3. The image forming system according to claim 2, wherein, when the operation unit is placed on the top surface of the first housing, the band being contained in the containing portion does not touch the top surface.

4. The image forming system according to claim 1, wherein the operation unit further includes a contact portion that contacts the top surface of the first housing when the operation unit is placed on the top surface.

5. The image forming system according to claim 4, wherein the contact portion includes a first contact portion and a second contact portion, and wherein the first contact portion is placed upstream from a center of gravity of the operation unit in a direction from top to bottom of an image displayed by the display, and the second contact portion is placed downstream from the center of gravity of the operation unit in the direction from the top to the bottom of the image displayed by the display.

6. The image forming system according to claim 5, wherein the contact portion further includes a third contact portion and a fourth contact portion, and the center of gravity of the operation unit is in an area surrounded by the first contact portion, the second contact portion, the third contact portion, and the fourth contact portion.

7. The image forming system according to claim 1, wherein both ends of the band in a direction from left to right of an image displayed by the display are fixed on the surface of the operation unit opposite to the surface on which the display is disposed.

8. The image forming system according to claim 7, wherein one of the ends of the band is able to be moved on the second housing in the direction from the left to the right of the image displayed by the display.

9. The image forming system according to claim 1, wherein the operation unit further includes a rotating member that is rotatable in a predetermined direction, wherein the display and the top surface of the first housing make a second degree in a first state where the rotating member and the top surface make a first degree, and wherein the display and the top surface make a fourth degree larger than the second degree when the rotating member in the first state is rotated in the predetermined direction to make a third degree with the top surface.

* * * * *